United States Patent
Cui et al.

(10) Patent No.: US 12,519,640 B2
(45) Date of Patent: Jan. 6, 2026

(54) SYSTEMS AND METHODS FOR MULTI-PARTY PRIVATE SET INTERSECTION

(71) Applicant: Alipay (Hangzhou) Information Technology Co., Ltd., Zhejiang (CN)

(72) Inventors: Jinming Cui, Hangzhou (CN); Pu Duan, Hangzhou (CN); Li Wang, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 119 days.

(21) Appl. No.: 18/298,296

(22) Filed: Apr. 10, 2023

(65) Prior Publication Data
US 2023/0336345 A1   Oct. 19, 2023

(30) Foreign Application Priority Data
Apr. 15, 2022   (CN) .......................... 202210396044.5

(51) Int. Cl.
*H04L 29/06*   (2006.01)
*G06F 21/62*   (2013.01)
(Continued)

(52) U.S. Cl.
CPC ........ *H04L 9/3066* (2013.01); *G06F 21/6245* (2013.01); *H04L 63/0428* (2013.01);
(Continued)

(58) Field of Classification Search
None
See application file for complete search history.

(56) References Cited

U.S. PATENT DOCUMENTS

| 11,599,655 B1 * | 3/2023 | Meng ..................... H04L 9/3242 |
| 2015/0149763 A1 | 5/2015 | Kamara |

(Continued)

FOREIGN PATENT DOCUMENTS

| CN | 111555880 | 8/2020 |
| CN | 111723384 | 9/2020 |

(Continued)

OTHER PUBLICATIONS anquan.baidu.com, [online] "MesaTEE Open Source: Privacy-Preserving High-Performance, General-Purpose Secure Computing Becomes a Reality," Aug. 8, 2019, retrieved on Jun. 6, 2023, retrieved from URL <https://anquan.baidu.com/article/854>, 12 pages(with English translation).

(Continued)

*Primary Examiner* — Jeffery L Williams
(74) *Attorney, Agent, or Firm* — Fish & Richardson P.C.

(57) ABSTRACT

Computer-implemented methods, apparatuses, storage media, and system are disclosed. In an example, a first terminal device sends first encrypted data to a second terminal device. The second terminal device encrypts the first encrypted data by using a second public key to obtain second encrypted data, and sends the second encrypted data and third encrypted data to the first terminal device. The first terminal device encrypts the third encrypted data by using a first public key to obtain fourth encrypted data, acquires first intersection data of the second encrypted data and the fourth encrypted data, and sends the first intersection data to a third terminal device. The third terminal device acquires fifth encrypted data from the first terminal device, determines second intersection data based on the fifth encrypted data and the first intersection data, and sends the second intersection data to the first terminal device and the second terminal device.

20 Claims, 12 Drawing Sheets

(51) Int. Cl.
*H04L 9/30* (2006.01)
*H04L 9/40* (2022.01)

(52) U.S. Cl.
CPC ............ *H04L 63/0442* (2013.01); *H04L 9/30* (2013.01); *H04L 2209/46* (2013.01)

(56) References Cited

U.S. PATENT DOCUMENTS

| | | | |
|---|---|---|---|
| 2020/0175178 A1 | 6/2020 | Li et al. | |
| 2023/0045553 A1* | 2/2023 | Deshpande | H04L 63/0478 |
| 2023/0053566 A1* | 2/2023 | Horne | G06F 21/6227 |
| 2023/0102423 A1* | 3/2023 | Yanai | H04L 9/14 |
| | | | 380/46 |
| 2023/0109352 A1* | 4/2023 | Wang | H04L 9/008 |
| | | | 713/153 |
| 2023/0164125 A1* | 5/2023 | Kravitz | H04L 63/0435 |
| | | | 713/171 |
| 2023/0334333 A1* | 10/2023 | Zheng | G06N 3/098 |
| 2023/0336345 A1* | 10/2023 | Cui | H04L 9/085 |
| 2023/0388102 A1* | 11/2023 | Tueno | H04L 9/008 |
| 2024/0386020 A1* | 11/2024 | Badrinarayanan | |
| | | | G06F 16/24558 |

FOREIGN PATENT DOCUMENTS

| | | | | |
|---|---|---|---|---|
| CN | 111741020 | | 10/2020 | |
| CN | 111753318 | | 10/2020 | |
| CN | 112148801 | | 12/2020 | |
| CN | 112434329 A | | 3/2021 | |
| CN | 113079137 | | 7/2021 | |
| CN | 113468601 A | | 10/2021 | |
| CN | 114172746 | | 3/2022 | |
| CN | 114172746 A | * | 3/2022 | |
| CN | 114172746 B | * | 4/2022 | |
| CN | 114900325 A | * | 8/2022 | H04L 41/12 |
| CN | 118607006 A | * | 9/2024 | |
| CN | 114386089 B | * | 2/2025 | G06F 21/602 |
| WO | WO 2021017420 A1 | | 2/2021 | |
| WO | WO 2021/115591 | | 6/2021 | |
| WO | WO 2022/076038 | | 4/2022 | |
| WO | WO-2022076038 A1 | * | 4/2022 | G06F 16/2246 |
| WO | WO-2022076605 A1 | * | 4/2022 | G06F 16/2455 |

OTHER PUBLICATIONS

Extended European Search Report in European Appln. No. 23168142.0, mailed on Apr. 8, 2023, 8 pages.
Ion et al., "On deploying secure computing: Private intersection-sum-with-cardinality," In 2020 IEEE European Symposium on Security and Privacy (EuroS&P), Sep. 7, 2020, p. 370-389.
Tang et al., "Protocol of Privacy-preserving Set Intersection Computation," Netinfo Security, 2020, 20(1):9-15 (with English abstract).
anquan.baidu.com [online], "Deep Learning Combined with Confidential Computing to Offer Enhanced Security and Full Functionality," available on or before Mar. 18, 2022, via Internet Archive: Wayback Machine URL<https://web.archive.org/web/20220318230427/https://anquan.baidu.com/upload/ue/file/20201217/1608198822764247.pdf>, retrieved on May 28, 2025, retrieved from URL<https://anquan.baidu.com/upload/ue/file/20201217/1608198822764247.pdf>, 5 pages.
Badrinarayanan et al., "Multi-Party Threshold Private Set Intersection with Sublinear Communication," Cryptology ePrint Archive, Mar. 1, 2021, 2020/600, 42 pages.
Hazay et al., "Scalable Multi-Party Private Set-Intersection," Cryptology ePrint Archive, Aug. 18, 2018, 2017/027, 26 pages.
Kolesnikov et al., "Practical Multi-party Private Set Intersection from Symmetric-Key Techniques," Cryptology ePrint Archive, Aug. 25, 2017, 2017/799, 25 pages.
medium.com [online], "MesaTEE Open-Source Released; A Framework for Universal Secure Computing," Jul. 10, 2019, retrieved on May 28, 2025, retrieved from URL<https://medium.com/baiduxlab/mesatee-open-source-released-a-framework-for-universal-secure-computing-27211ed85ae9>, 17 pages.

* cited by examiner

SYSTEMS AND METHODS FOR MULTI-PARTY PRIVATE SET INTERSECTION

CROSS-REFERENCE TO RELATED APPLICATIONS

This application claims priority to Chinese Patent Application No. 202210396044.5, filed on Apr. 15, 2022, which is hereby incorporated by reference in its entirety.

TECHNICAL FIELD

This specification relates to the field of computer technologies, and in particular, to data determination methods, apparatuses, storage media, and terminal devices.

BACKGROUND

With the development of science and technology, the security of data exchange gradually becomes big concern of users. Elliptic curve cryptography is a cryptographic algorithm based on the elliptic curve problem in the finite field. Compared with conventional finite-field cryptography, elliptic curve cryptography can have a shorter key length at the same security level than conventional finite-field cryptography, and the application range of elliptic curve cryptography can be expanded. There is no multi-party private set intersection protocol based on elliptic curves among the multi-party private set intersection protocols in related technologies.

SUMMARY

Some embodiments of this specification provide data determination methods, apparatuses, storage media, and terminal devices so as to fully meet network bandwidth requirements, hardware requirements, and security requirements, and improve convenience of using a multi-party private set intersection protocol.

According to a first aspect, some embodiments of this specification provide a data determination method, including: sending, by a first terminal device, first encrypted data to a second terminal device, where the first encrypted data is obtained by the first terminal device by encrypting a first data set in the first terminal device by using a first public key; encrypting, by the second terminal device, the first encrypted data by using a second public key to obtain second encrypted data, and sending the second encrypted data and third encrypted data to the first terminal device, where the third encrypted data is obtained by the second terminal device by encrypting a second data set in the second terminal device by using the second public key; encrypting, by the first terminal device, the third encrypted data by using the first public key to obtain fourth encrypted data, acquiring first intersection data of the second encrypted data and the fourth encrypted data, and sending the first intersection data to a third terminal device; acquiring, by the third terminal device, fifth encrypted data sent by the first terminal device, where the fifth encrypted data is obtained based on a third data set in the third terminal device, the first public key, the second public key, and a third public key; and determining, by the third terminal device, second intersection data based on the fifth encrypted data and the first intersection data, and sending the second intersection data to the first terminal device and the second terminal device.

According to a second aspect, some embodiments of this specification provide a data determination method, including: sending first encrypted data to a second terminal device, where the first encrypted data is obtained by encrypting a first data set in a first terminal device by using a first public key; acquiring second encrypted data and third encrypted data sent by the second terminal device, where the second encrypted data is obtained based on the first encrypted data and a second public key, and the third encrypted data is obtained based on the second public key and a second data set in the second terminal device; encrypting the third encrypted data by using the first public key to obtain fourth encrypted data, acquiring first intersection data of the second encrypted data and the fourth encrypted data, and sending the first intersection data to the third terminal device; acquiring fifth encrypted data based on a third data set in the third terminal device, the first public key, the second public key, and a third public key; and sending the fifth encrypted data to the third terminal device, and acquiring second intersection data sent by the third terminal device.

According to a third aspect, some embodiments of this specification provide a data determination method, including: acquiring first encrypted data sent by a first terminal device, where the first encrypted data is obtained by the first terminal device by encrypting a first data set in the first terminal device by using a first public key; encrypting the first encrypted data by using a second public key to obtain second encrypted data; sending the second encrypted data and third encrypted data to the first terminal device, where the third encrypted data is obtained by encrypting a second data set in a second terminal device by using the second public key, and the second encrypted data and the third encrypted data are used to instruct the one terminal device to acquire first intersection data based on the second encrypted data and the third encrypted data, and send the first intersection data to the third terminal device; and acquiring second intersection data sent by the third terminal device, where the second intersection data is determined by the third terminal device based on the first intersection data and fifth encrypted data, and the fifth encrypted data is obtained based on a third data set in the third terminal device, the first public key, the second public key, and a third public key.

According to a fourth aspect, some embodiments of this specification provide a data determination method, including: acquiring first intersection data sent by a first terminal device, where the first intersection data is obtained by the first terminal device based on second encrypted data and fourth encrypted data; acquiring fifth encrypted data sent by the first terminal device, where the fifth encrypted data is obtained based on a third data set in a third terminal device, a first public key, a second public key, and a third public key; and determining second intersection data based on the fifth encrypted data and the first intersection data, and sending the second intersection data to the first terminal device and a second terminal device.

According to a fifth aspect, some embodiments of this specification provide a data determination apparatus, including: a first data sending unit, configured to send first encrypted data to a second terminal device, where the first encrypted data is obtained by encrypting a first data set in a first terminal device by using a first public key; a first data acquisition unit, configured to acquire second encrypted data and third encrypted data sent by the second terminal device, where the second encrypted data is obtained based on the first encrypted data and a second public key, and the third encrypted data is obtained based on the second public key and a second data set in the second terminal device; an intersection data acquisition unit, configured to encrypt the third encrypted data by using the first public key to obtain fourth encrypted data, acquire first intersection data of the second encrypted data and the fourth encrypted data, and send the first intersection data to a third terminal device; a second data acquisition unit, configured to acquire fifth encrypted data based on a third data set in the third terminal device, the first public key, the second public key, and a third public key; and a second data sending unit, configured to send the fifth encrypted data to the third terminal device, and acquire second intersection data sent by the third terminal device.

According to a sixth aspect, some embodiments of this specification provide a data determination apparatus, including: a third data acquisition unit, configured to acquire first encrypted data sent by a first terminal device, where the first encrypted data is obtained by the first terminal device by encrypting a first data set in the first terminal device by using a first public key; a first data encryption unit, configured to encrypt the first encrypted data by using a second public key to obtain second encrypted data; a third data sending unit, configured to send the second encrypted data and third encrypted data to the first terminal device, where the third encrypted data is obtained by encrypting a second data set in a second terminal device by using the second public key, and the second encrypted data and the third encrypted data are used to instruct the one terminal device to acquire first intersection data based on the second encrypted data and the third encrypted data, and send the first intersection data to the third terminal device; and a fourth data acquisition unit, configured to acquire second intersection data sent by the third terminal device, where the second intersection data is determined by the third terminal device based on the first intersection data and fifth encrypted data, and the fifth encrypted data is obtained based on a third data set in the third terminal device, the first public key, the second public key, and a third public key.

According to a seventh aspect, some embodiments of this specification provide a data determination apparatus, including: a fifth data acquisition unit, configured to acquire first intersection data sent by a first terminal device, where the first intersection data is obtained by the first terminal device based on second encrypted data and fourth encrypted data; a sixth data acquisition unit, configured to acquire fifth encrypted data sent by the first terminal device, where the fifth encrypted data is obtained based on a third data set in a third terminal device, a first public key, a second public key, and a third public key; and a fourth data sending unit, configured to determine second intersection data based on the fifth encrypted data and the first intersection data, and send the second intersection data to the first terminal device and a second terminal device.

According to an eighth aspect, some embodiments of this specification provide a computer storage medium. The computer storage medium stores instructions. The instructions can be loaded and executed by a computer to perform the method steps described above.

According to a ninth aspect, some embodiments of this specification provide a terminal device. The terminal device can include a processor and a memory. The memory stores a computer program, and the computer program can be loaded and executed by the computer to perform the method steps described above.

According to a tenth aspect, a computer program product includes a computer program, and the computer program is executed by a processor to perform the method steps described above.

In some embodiments of this specification, a first terminal device sends first encrypted data to a second terminal device; the second terminal device encrypts the first encrypted data by using a second public key to obtain second encrypted data, and sends the second encrypted data and third encrypted data to the first terminal device; the first terminal device encrypts the third encrypted data by using a first public key to obtain fourth encrypted data, acquires first intersection data of the second encrypted data and the fourth encrypted data, and sends the first intersection data to a third terminal device; the third terminal device acquires fifth encrypted data sent by the first terminal device; the third terminal device determines second intersection data based on the fifth encrypted data and the first intersection data, and sends the second intersection data to the first terminal device and the second terminal device. Therefore, in the data determination process, the public key of each terminal device is used to encrypt the data without using a mature symmetric cryptography primitive, the network bandwidth requirement is low, and the immature homomorphic encryption is not needed. As such, low security problem can be alleviated, the security of the data determination can be improved, the network bandwidth requirement, the hardware requirement, and the security requirement can all be met, and the convenience of using the multi-party private set intersection protocol can be improved.

BRIEF DESCRIPTION OF DRAWINGS

To describe the technical solutions in some embodiments of this specification or in the existing technology more clearly, the following briefly describes the accompanying drawings needed for describing some embodiments or the existing technology. Clearly, the accompanying drawings in the following descriptions merely show some embodiments of this specification, and a person of ordinary skill in the art can still derive other drawings from these accompanying drawings without creative efforts.

DESCRIPTION OF EMBODIMENTS

The following clearly describes the technical solutions in some embodiments of this specification with reference to the accompanying drawings in some embodiments of this specification. Clearly, some described embodiments are merely some but not all of embodiments of this specification. All other embodiments obtained by a person of ordinary skill in the art based on some embodiments of this specification without creative efforts shall fall within the protection scope of this specification.

In the description of this specification, it is worthwhile to note that the terms "first", "second", and the like are merely used for descriptive purposes, and should not be understood as indicating or implying relative importance. In the description of this specification, it is worthwhile to note that, unless expressly stated and defined otherwise, the terms "including", "comprising", "having", and any other variant thereof, are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device. For a person of ordinary skill in the art, a specific meaning of the previously described terms in this specification can be understood according to a specific situation. In addition, in the description of this specification, unless otherwise stated, "a plurality of" means two or more. The term "and/or" describes an association relationship between associated objects and indicates that three relationships can exist. For example, A and/or B can indicate the following three cases: Only A exists, both A and B exist, and only B exists. The character "/" generally indicates an "or" relationship between the associated objects.

Elliptic curve cryptography (ECC) is an algorithm for establishing public key encryption based on elliptic curve mathematics. The use of elliptic curves in cryptography was independently proposed in 1985 by Neal Koblitz and Victor Miller, respectively.

In some embodiments, the primary advantage of ECC is that it provides a comparable or higher level of security using smaller keys than other methods, such as Rivest-Shamir-Adleman (RSA) encryption algorithms, in some cases. Another advantage of ECC is that bilinear mappings between groups can be defined based on Weil pairs or Tate pairs. Bilinear mappings have found numerous applications in cryptography, such as identity-based encryption. A disadvantage is that the implementation of encryption and decryption operations under the same-length keys takes a longer time than other mechanisms. However, since a shorter key can be used to achieve the same-level security level, the speed is higher at the same-level security level.

Figure 1:
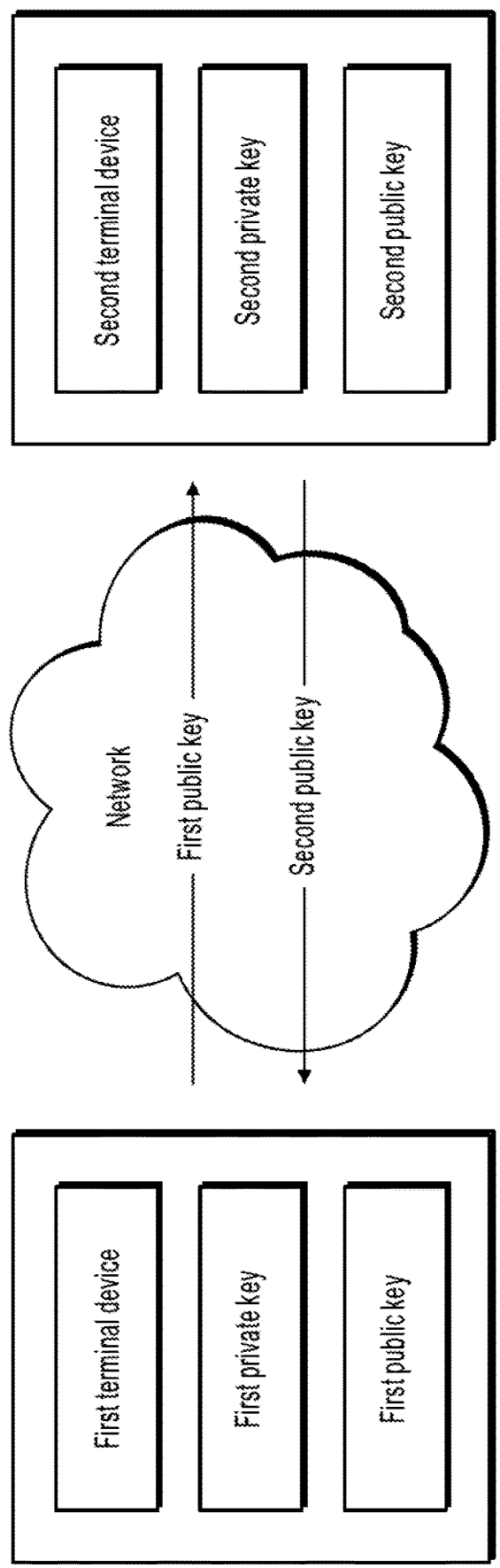
FIG. 1 is an example schematic diagram illustrating a background of a data determination method, according to some embodiments of this specification.

FIG. 1 is an example schematic diagram illustrating a background of a data determination method, according to some embodiments of this specification. As shown in FIG. 1, in the two-party elliptic curve key exchange protocol (2-party ECDH), a first terminal device can acquire a first public key and a first private key, and a second terminal device can acquire a second public key and a second private key. The first terminal device and the second terminal device can exchange respective public keys through a network, i.e., the first terminal device can send the first public key to the second terminal device, and the second terminal device can send the second public key to the first terminal device. The first terminal device can compute the first key based on the first public key and the second public key. The second terminal device can compute a second key based on the first public key and the second public key. The first key and the second key are the same so that the first terminal device and the second terminal device can acquire a common key known only to the first terminal device and the second terminal device.

However, there is no multi-party private set intersection protocol based on elliptic curves among the multi-party private set intersection protocols in related technologies. In addition, a mature symmetric cryptography primitive needs high communication traffic to complete the calculation of the private set intersection, which requires a high network bandwidth. On the contrary, it does not require a high hardware requirement. On the basis of immature homomorphic encryption, the security has not reached consensus, the technology is not mature, and the hardware requirement is high. As a result, not all of the network bandwidth requirement, the hardware requirement, and the security requirement can be met. Consequently, the convenience of using the multi-party private set intersection protocol is poor. Here, mature symmetric cryptographic primitives (e.g., oblivious transfer (OT), oblivious pseudorandom function (OPRF), etc.) can be included.

The following describes in detail the data determination method provided in this specification with reference to some specific embodiments.

Figure 2:
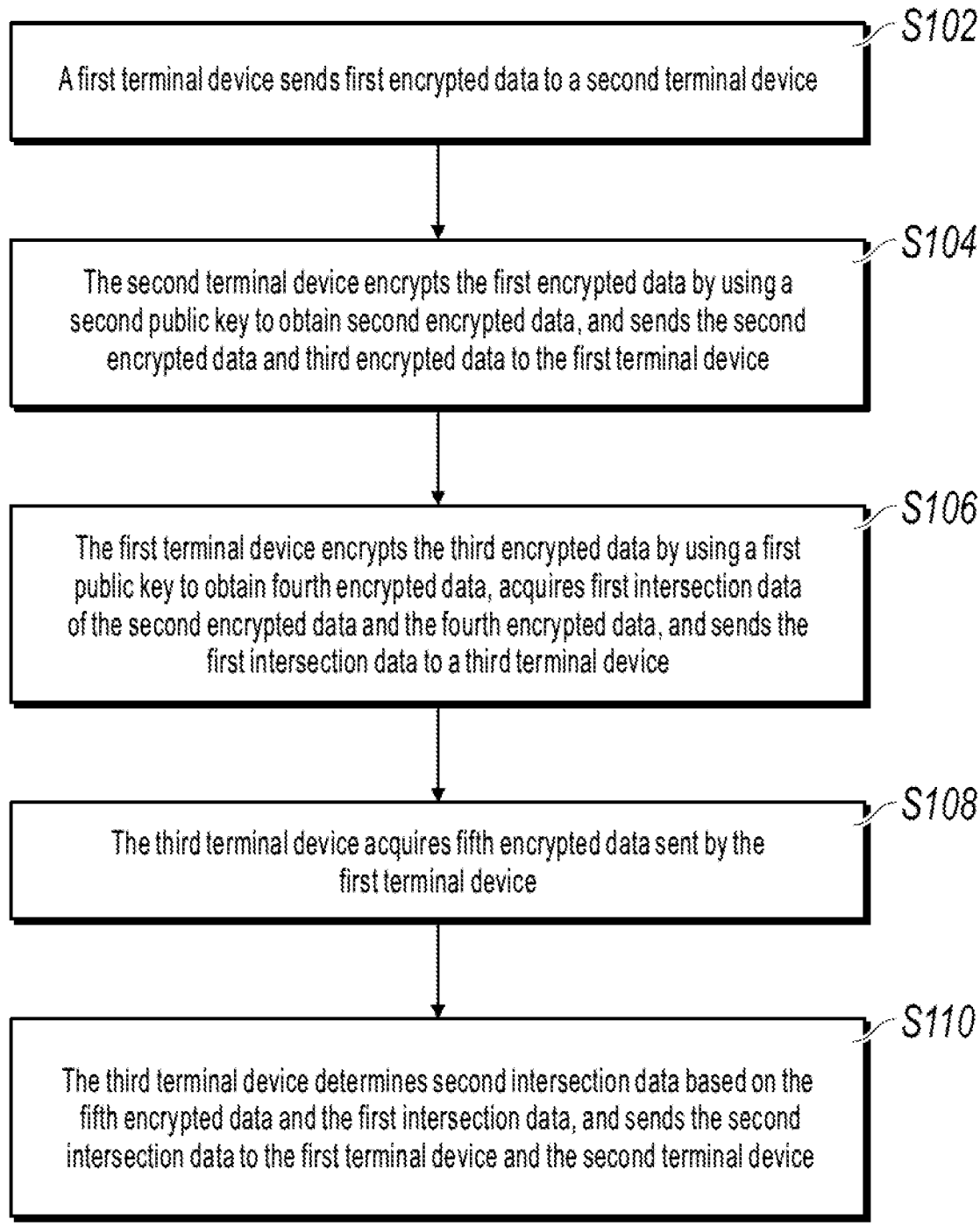
FIG. 2 is a schematic flowchart illustrating a data determination method, according to some embodiments of this specification.

FIG. 2 is a schematic flowchart illustrating a data determination method, according to some embodiments of this specification. As shown in FIG. 2, some embodiments of this specification are described from a first terminal device side, a second terminal device side, and a third terminal device side. The method can include the following steps S102 to S110.

S102: A first terminal device sends first encrypted data to a second terminal device.

According to some embodiments, the data determination method provided by some embodiments of this specification can be applied to a multi-party private set intersection protocol based on an elliptic curve. For example, the data determination method provided by some embodiments of this specification can be applied to a three-party private set intersection protocol based on an elliptic curve. The application scenarios of the data determination method provided in some embodiments of this specification include but are not limited to an advertising scenario, a data statistics scenario, a blacklist mechanism scenario, a client information determination scenario, and the like.

In some embodiments, a quantity of terminal devices in some embodiments of this specification is at least three. For example, the quantity of terminal devices can be three. The three terminal devices can be, for example, a first terminal device, a second terminal device, and a third terminal device. Different terminal devices are used to perform different steps in the data determination method.

According to some embodiments, the first encrypted data is obtained by the first terminal device by encrypting a first data set in the first terminal device by using a first public key. The first data set is a data set stored in the first terminal device. The first data set is not necessarily a fixed data set. For example, when the type of data included in the first data set changes, the first data set can also change accordingly. For example, when the amount of data included in the first data set changes, the first data set can also change accordingly.

It will be readily understood that the first public key is a public key generated by the first terminal device based on elliptic curve parameters. The first public key is not necessarily a fixed public key. For example, when the first private key acquired by the first terminal device changes, the first public key generated by the first terminal device based on the first private key can also change accordingly.

In some embodiments, the first terminal device can encrypt the first data set in the first terminal device by using the first public key to obtain the first encrypted data. When the first terminal device obtains the first encrypted data, the first terminal device can send the first encrypted data to the second terminal device.

S104: The second terminal device encrypts the first encrypted data by using the second public key to obtain second encrypted data, and sends the second encrypted data and third encrypted data to the first terminal device.

According to some embodiments, the second terminal device is a terminal device in a multi-party transaction protocol that receives the first encrypted data. The second terminal device is not necessarily a fixed terminal device. For example, there can be multiple second terminal devices in a multi-party private set intersection protocol.

In some embodiments, the second public key is a public key generated by the second terminal device based on elliptic curve parameters. The second public key is not necessarily a fixed public key. For example, when the second private key acquired by the second terminal device changes, the second public key generated by the second terminal device based on the second private key can change accordingly.

It will be readily understood that the second encrypted data is obtained by the second terminal device after obtaining the first encrypted data sent by the first terminal device and encrypting the first encrypted data by using the second public key. The second encrypted data is not necessarily fixed data. For example, when the first encrypted data or the second public key changes, the second encrypted data can also change accordingly.

Optionally, the third encrypted data is obtained by the second terminal device by encrypting the second data set in the second terminal device by using the second public key. The second data set is a data set stored in the second terminal device. The second data set is not necessarily a fixed data set. For example, when the type of data included in the second data set changes, the second data set can also change accordingly. For example, when the amount of data included in the second data set changes, the second data set can also change accordingly.

In some embodiments, the first terminal device can encrypt the first data set in the first terminal device by using the first public key to obtain the first encrypted data. When the first terminal device obtains the first encrypted data, the first terminal device can send the first encrypted data to the second terminal device. The second terminal device can acquire the first encrypted data sent by the first terminal device, and the second terminal device can encrypt the first encrypted data by using the second public key to obtain the second encrypted data. The second terminal device can also encrypt the second data set in the second terminal device by using the second public key to obtain third encrypted data, and the second terminal device can send the second encrypted data and the third encrypted data to the first terminal device.

S106: The first terminal device encrypts the third encrypted data by using the first public key to obtain fourth encrypted data, acquires first intersection data of the second encrypted data and the fourth encrypted data, and sends the first intersection data to the third terminal device.

According to some embodiments, the fourth encrypted data is data obtained by the first terminal device by encrypting the third encrypted data sent by the second terminal device by using the first public key. The fourth encrypted data is not necessarily fixed data. For example, when the first public key or the third encrypted data changes, the fourth encrypted data can change accordingly.

In some embodiments, the first intersection data is intersection data between the first data set in the first terminal device and the second data set in the second terminal device that are determined by the first terminal device. The first intersection data is used to indicate a data intersection between the first data set and the second data set, the first intersection data includes at least one piece of data, i.e., the first intersection data includes an amount of data that is not necessarily fixed data.

It will be readily understood that, the first intersection data is not necessarily fixed data. For example, when the type of data included in the first intersection data changes, the first intersection data can also change accordingly. For example, when the amount of data included in the first intersection data changes, the first intersection data can also change accordingly.

In some embodiments, the third terminal device is a terminal device in a multi-party transaction protocol for determining intersection data in a multi-party data set. The third terminal device is not necessarily a fixed terminal device. For example, when an identifier of the third terminal device changes, the third terminal device can change accordingly.

According to some embodiments, when the first terminal device obtains the second encrypted data and the third encrypted data sent by the second terminal device, the first terminal device encrypts the third encrypted data by using the first public key to obtain the fourth encrypted data, acquires the first intersection data of the second encrypted data and the fourth encrypted data, and sends the first intersection data to the third terminal device.

S108: The third terminal device acquires fifth encrypted data sent by the first terminal device.

In some embodiments, the fifth encrypted data can be obtained by the first terminal device based on a third data set in the third terminal device, the first public key, the second public key, and a third public key. The fifth encrypted data is not necessarily fixed data. For example, when any one of the third data set in the third terminal device, the first public key, the second public key, and the third public key changes, the third terminal device can also change accordingly.

According to some embodiments, the third data set is a data set stored in the third terminal device. The third data set is not necessarily a fixed data set. For example, when the type of data included in the third data set changes, the third data set can also change accordingly. For example, when the amount of data included in the third data set changes, the third data set can also change accordingly.

In some embodiments, the third public key is a public key generated by the third terminal device based on elliptic curve parameters. The third public key is not necessarily a fixed public key. For example, when the third private key acquired by the third terminal device changes, the third public key generated by the second terminal device based on the third private key can change accordingly.

In some embodiments, when the first terminal device obtains the fifth encrypted data based on the third data set in the third terminal device, the first public key, the second public key, and the third public key, the first terminal device can send the fifth encrypted data to the third terminal device. The third terminal device can acquire the fifth encrypted data sent by the first terminal device.

S110: The third terminal device determines second intersection data based on the fifth encrypted data and the first intersection data, and sends the second intersection data to the first terminal device and the second terminal device.

In some embodiments, the second intersection data is intersection data among the first data set, the second data set, and the third data set determined by the third terminal device. The second intersection data is not necessarily fixed data. For example, when any one of the first data set, the second data set, and the third data set changes, the second intersection data can also change accordingly.

According to some embodiments, when the first terminal device obtains the fifth encrypted data based on the third data set in the third terminal device, the first public key, the second public key, and the third public key, the first terminal device can send the fifth encrypted data and the first intersection data to the third terminal device. The third terminal device can acquire the fifth encrypted data and the first intersection data sent by the first terminal device. The third terminal device can determine the second intersection data based on the fifth encrypted data and the first intersection data, and send the second intersection data to the first terminal device and the second terminal device.

In some embodiments of this specification, a first terminal device sends first encrypted data to a second terminal device; the second terminal device encrypts the first encrypted data by using a second public key to obtain second encrypted data, and sends the second encrypted data and third encrypted data to the first terminal device; the first terminal device encrypts the third encrypted data by using a first public key to obtain fourth encrypted data, acquires first intersection data of the second encrypted data and the fourth encrypted data, and sends the first intersection data to a third terminal device; the third terminal device acquires fifth encrypted data sent by the first terminal device; the third terminal device determines second intersection data based on the fifth encrypted data and the first intersection data, and sends the second intersection data to the first terminal device and the second terminal device. Therefore, in the data determination process, the public key of each terminal device is used to encrypt the data without using a mature symmetric cryptography primitive, the network bandwidth requirement is low, and the immature homomorphic encryption is not needed. As such, low security problem can be alleviated, the security of the data determination can be improved, the network bandwidth requirement, the hardware requirement, and the security requirement can all be met, and the convenience of using the multi-party private set intersection protocol can be improved.

Figure 3:
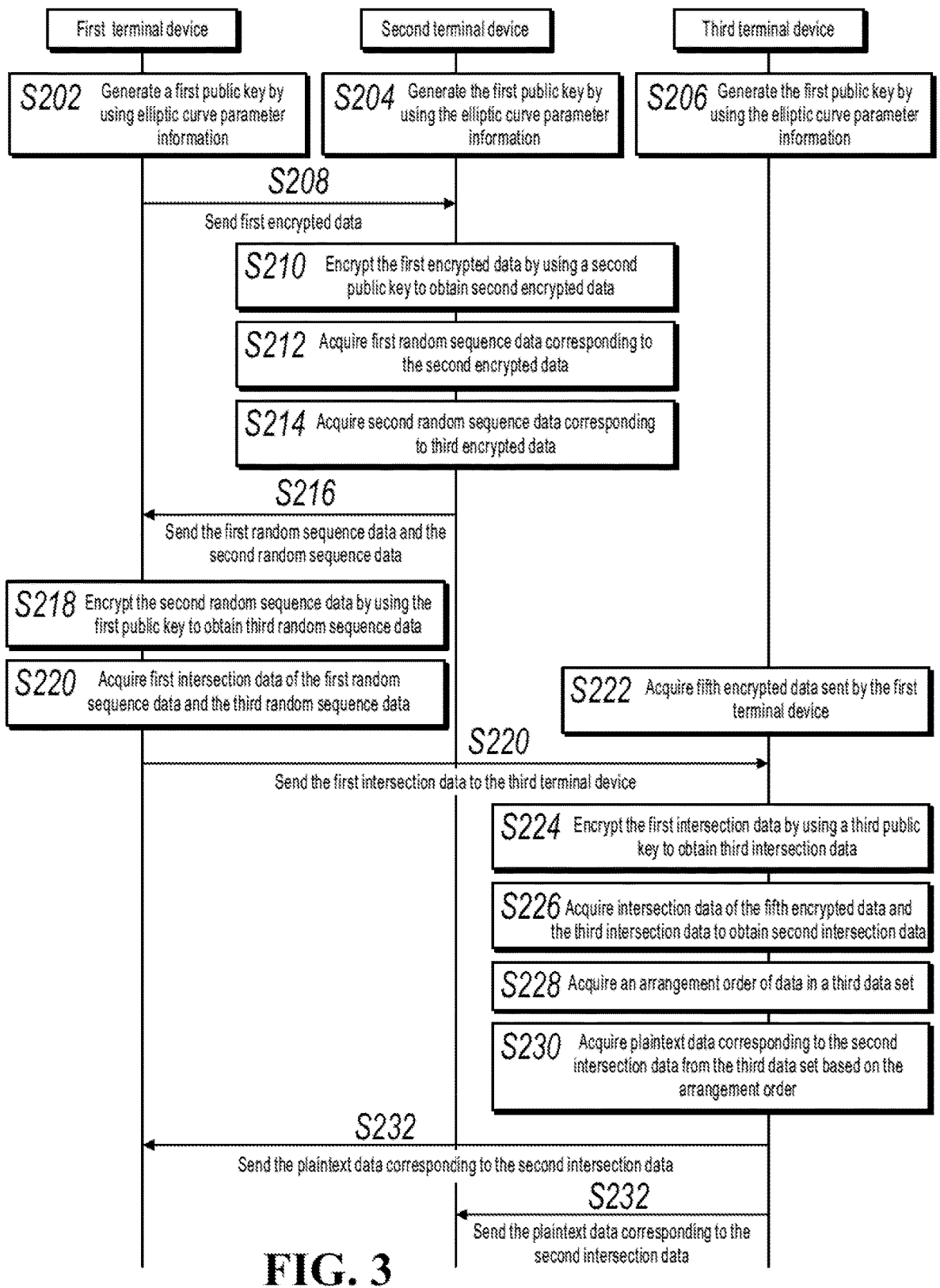
FIG. 3 is a schematic flowchart illustrating a data determination method, according to some embodiments of this specification.

FIG. 3 is a schematic flowchart illustrating a data determination method, according to some embodiments of this specification. As shown in FIG. 3, some embodiments of this specification are described from the first terminal device side, the second terminal device side, and the third terminal device side. The method can include the following steps S202 to S232.

S202: The first terminal device generates the first public key by using the elliptic curve parameter information.

According to some embodiments, elliptic curve cryptography is a cryptographic algorithm based on the elliptic curve problem in the finite field. Based on elliptic curve cryptography, cryptographic primitives such as key exchange protocols, digital signatures, and asymmetric encryption can be implemented. Compared with conventional finite-field cryptography (e.g., RSA), elliptic curve cryptography can have a shorter key length at the same security level than conventional finite-field cryptography, and therefore has a wide range of application scenarios in reality.

In some embodiments, elliptic curves can be represented using the form of Formula (1), where a and b are constants and $4a^3+27b^2 \neq 0$.

$$y^2x^3+ax+b \qquad \text{Formula (1)}$$

To further use elliptic curve cryptography, the following parameters can also be obtained: a prime number p; a base point G; a subgroup order n; and a subgroup co-factor h.

Thus, the main parameters of the elliptic curve cryptography algorithm can be summarized as (p, a, b, G, n, h), that is, for example, i.e., elliptic curve parameters include, but are not limited to, a prime number p, a base point G, a subgroup order n, a subgroup co-factor h, a constant a, a constant b, etc.

In some embodiments, in a multi-party private set intersection protocol, a plurality of terminal devices can mutually confirm the same security parameter. The security parameter can be, for example, 128 bits.

In some embodiments, the first terminal device can generate the first key based on a random number and the base point G. Since the random number is not fixed to a specific value, the first key is not necessarily a fixed key. The first terminal device can generate the first public key by using elliptic curve parameter information. When the first terminal device generates the first public key based on the elliptic curve parameter information, the first terminal device can generate the first public key $d_0$ by using the first private key and the base point G.

S204: The second terminal device generates the second public key by using the elliptic curve parameter information.

In some embodiments, the second public key is a public key generated by the second terminal device. The second terminal device can generate the second public key by using the elliptic curve parameter information. For example, when the second terminal device generates the second public key based on the elliptic curve parameter information, the second terminal device can generate the second public key $d_1$ by using the second private key and the base point G. The second private key can be generated by the second terminal device based on the random number and the base point G.

S206: The third terminal device generates the third public key by using the elliptic curve parameter information.

In some embodiments, the third public key is a public key generated by the third terminal device. The third terminal device can generate the third public key by using the elliptic curve parameter information. For example, when the third terminal device generates the third public key based on the elliptic curve parameter information, the third terminal device can generate the third public key $d_2$ by using the third private key and the base point G. The third private key can be generated by the third terminal device based on the random number and the base point G.

S208: The first terminal device sends the first encrypted data to the second terminal device.

A specific process has been described above, and details are omitted for simplicity.

According to some embodiments, the first data set can be, for example, first advertiser information that the first terminal device can use when advertising. The first encrypted data can, for example, be obtained by the first terminal device by encrypting the first advertiser information in the first terminal device by using the first public key.

In some embodiments, the first data set can be, for example, $X_0 \in F^n$, where $X_0$ includes n elements. The first encrypted data can be, for example, $E_0$ obtained by the first terminal device by encrypting the first data set $X_0$ by using the first public key $d_0$.

S210: The second terminal device encrypts the first encrypted data by using the second public key to obtain second encrypted data.

A specific process has been described above, and details are omitted for simplicity.

According to some embodiments, the first data set can be, for example, advertiser information that the first terminal device can use when advertising. The first encrypted data can, for example, be obtained by the first terminal device by encrypting the advertiser information in the first terminal device by using the first public key. The first terminal device can send the encrypted first advertiser information to the second terminal device. The second terminal device can use the second public key to re-encrypt the encrypted first advertiser information to obtain the second encrypted data.

In some embodiments, the first data set can be, for example, $X_0 \in F^n$, where $X_0$ includes n elements. The first encrypted data can be, for example, $E_0$ obtained by the first terminal device by encrypting the first data set $X_0$ by using the first public key $d_0$. The second terminal device encrypts the first encrypted data $E_0$ by using the second public key $d_1$ to obtain the second encrypted data $E'_0$.

S212: The second terminal device acquires first random sequence data corresponding to the second encrypted data.

In some embodiments, the first random sequence data is data obtained after random shuffling of the second encrypted data. The first random sequence data is not necessarily fixed data. Since the second terminal device randomly shuffles the second encrypted data and the order of the shuffling is uncertain, the first random sequence data is not fixed.

According to some embodiments, when the second terminal device obtains the second encrypted data, the second terminal device can obtain the first random sequence data corresponding to the second encrypted data. For example, the second terminal device can acquire the first random sequence data $\pi(E'_0)$ corresponding to the second encrypted data $E'_0$.

S214: The second terminal device acquires second random sequence data corresponding to the third encrypted data.

In some embodiments, the second random sequence data is data obtained after random shuffling of the third encrypted data. The second random sequence data is not necessarily fixed data. Since the second terminal device randomly shuffles the third encrypted data and the order of the shuffling is uncertain, the second random sequence data is not fixed.

According to some embodiments, when the second terminal device obtains the third encrypted data, the second terminal device can obtain the second random sequence data corresponding to the third encrypted data. For example, the second terminal device can acquire the second random sequence data $\pi(E_1)$ corresponding to the third encrypted data $E_1$. The second data set can be, for example, $X_1 \in F^n$, where $X_1$ includes n elements. The third encrypted data $E_1$ can, for example, be obtained by the second terminal device by encrypting the second data set $X_1$ by using the second public key $d_1$. The second terminal device acquires the first random sequence data corresponding to the second encrypted data and the second random sequence data corresponding to the third encrypted data so that the probability that the first terminal device obtains the intersection data between the first data set and the second data set can be reduced, the intersection data between the data sets of any two terminal devices obtained by the terminal device in the multi-party transaction protocol can be reduced, and the accuracy of data determination in the multi-party transaction protocol can be improved.

S216: The second terminal device sends the first random sequence data and the second random sequence data to the first terminal device.

According to some embodiments, when the second terminal device obtains the first random sequence data corresponding to the second encrypted data and obtains the second random sequence data corresponding to the third encrypted data, the second terminal device can send the first random sequence data and the second random sequence data to the first terminal device.

In some embodiments, when the second terminal device obtains the first random sequence data $\pi(E'_0)$ corresponding to the second encrypted data $E'_0$ and the second random sequence data $\pi(E_1)$ corresponding to the third encrypted data $E_1$, the second terminal device can send the first random sequence data $\pi(E'_0)$ and the second random sequence data $\pi(E_1)$ to the first terminal device.

S218: The first terminal device encrypts the second random sequence data by using the first public key to obtain third random sequence data.

According to some embodiments, the third random sequence data is data obtained after the first terminal device encrypts the second random sequence data. The third random sequence data is not necessarily fixed data. For example, when the order of random shuffling changes or the first public key changes, the third random sequence can also change accordingly.

When the second terminal device obtains the first random sequence data corresponding to the second encrypted data and obtains the second random sequence data corresponding to the third encrypted data, the second terminal device can send the first random sequence data and the second random sequence data to the first terminal device. The first terminal device can acquire the first random sequence data and the second random sequence data, and the first terminal device can encrypt the second random sequence data by using the first public key to obtain the third random sequence data.

In some embodiments, when the second terminal device obtains the first random sequence data $\pi(E'_0)$ corresponding to the second encrypted data $E'_0$ and the second random sequence data $\pi(E_1)$ corresponding to the third encrypted data $E_1$, the second terminal device can send the first random sequence data $\pi(E'_0)$ and the second random sequence data $\pi(E_1)$ to the first terminal device. The first terminal device can encrypt the second random sequence data $\pi(E_1)$ by using the first public key $d_0$ to obtain the third random sequence data $\pi(E_1)$.

S220: The first terminal device acquires first intersection data of the first random sequence data and the third random sequence data, and sends the first intersection data to the third terminal device.

According to some embodiments, when the first terminal device obtains the first random sequence data and the third random sequence data, the first terminal device can acquire the first intersection data of the first random sequence data and the third random sequence data, and send the first intersection data to the third terminal device.

In some embodiments, when the second terminal device obtains the first random sequence data $\pi(E'_0)$ corresponding to the second encrypted data $E'_0$ and the second random sequence data $\pi(E_1)$ corresponding to the third encrypted data $E_1$, the second terminal device can send the first random sequence data $\pi(E'_0)$ and the second random sequence data $\pi(E_1)$ to the first terminal device. The first terminal device can encrypt the second random sequence data $\pi(E_1)$ by using the first public key $d_0$ to obtain the third random sequence data $\pi(E'_1)$. The first terminal device can acquire the first intersection data $E'_0 \cap E'_1$ of the first random sequence data $\pi(E'_0)$ and the third random sequence data $\pi(E'_1)$, and send $E'_0 \cap E'_1$ to the third terminal device.

S222: The third terminal device acquires fifth encrypted data sent by the first terminal device.

A specific process has been described above, and details are omitted for simplicity.

According to some embodiments, when the third terminal device acquires the fifth encrypted data sent by the first terminal device based on the third data set in the third terminal device, the third terminal device encrypts the third data set in the third terminal device by using the third public key to obtain sixth encrypted data, and the third terminal device sends the sixth encrypted data to the second terminal device. The second terminal device encrypts the sixth encrypted data by using the second public key to obtain seventh encrypted data, and the second terminal device sends the seventh encrypted data to the first terminal device. The first terminal device encrypts the seventh encrypted data by using the first public key to obtain fifth encrypted data, and the first terminal device sends the fifth encrypted data to the third terminal device.

In some embodiments, the sixth encrypted data is obtained by the third terminal device by encrypting the third data set in the third terminal device. The sixth encrypted data is not necessarily fixed encrypted data. For example, when the third public key or the third data set changes, the sixth encrypted data can also change accordingly.

In some embodiments, the seventh encrypted data is obtained by the second terminal device by re-encrypting the sixth encrypted data. The seventh encrypted data is not necessarily fixed encrypted data. For example, when the second public key or the third data set changes, the sixth encrypted data can also change accordingly, and the seventh encrypted data can also change accordingly.

According to some embodiments, the third data set can be, for example, $X_2 \in F^n$, where $X_2$ includes n elements. The sixth encrypted data $E_2$ can, for example, be obtained by the third terminal device by encrypting the third data set $X_2$ by using the third public key $d_2$. The third terminal device can send the sixth encrypted data $E_2$ to the second terminal device. The second terminal device can encrypt the sixth encrypted data $E_2$ by using the second public key $d_1$ to obtain the seventh encrypted data $E'_2$. The second terminal device can send the seventh encrypted data $E'_2$ to the first terminal device. The first terminal device can encrypt the seventh encrypted data $E'_2$ by using the first public key $d_0$ to obtain the fifth encrypted data $E''_2$. The first terminal device can send the fifth encrypted data $E''_2$ to the third terminal device.

S224: The third terminal device encrypts the first intersection data by using the third public key to obtain third intersection data.

In some embodiments, the third intersection data is obtained by the third terminal device by encrypting the first intersection data. The third intersection data is not necessarily fixed data. For example, when the third public key or the first intersection data changes, the third intersection data can also change accordingly. When the third terminal device obtains the first intersection data sent by the first terminal device, the third terminal device can encrypt the first intersection data by using the third public key to obtain the third intersection data.

Optionally, the first terminal device can acquire the first intersection data $E'_0 \cap E'_1$ of the first random sequence data $\pi(E'_0)$ and the third random sequence data $\pi(E'_1)$, and send $E'_0 \cap E'_1$ to the third terminal device. The third terminal device can encrypt the first intersection data $E'_0 \cap E'_1$ by using the third public key $d_2$ to obtain the third intersection data $E''_0 \cap E''_1$.

S226: The third terminal device acquires intersection data of the fifth encrypted data and the third intersection data to obtain the second intersection data.

In some embodiments, when the third terminal device obtains the fifth encrypted data sent by the first terminal device, and encrypts the first intersection data by using the third public key to obtain the third intersection data, the third terminal device can acquire the intersection data of the fifth encrypted data and the third intersection data to obtain the second intersection data.

It will be readily understood that the first terminal device can encrypt the seventh encrypted data $E'_2$ by using the first public key $d_0$ to obtain the fifth encrypted data $E''_2$. The first terminal device can send the fifth encrypted data $E''_2$ to the third terminal device. The third terminal device can encrypt the first intersection data $E'_0 \cap E'_1$ by using the third public key $d_2$ to obtain the third intersection data $E''_0 \cap E''_1$. The third terminal device can acquire the intersection data of the fifth encrypted data $E''_2$ and the third intersection data $E''_0 \cap E''_1$ to obtain the second intersection data $E''_2 \cap (E''_0 \cap E''_1)$.

S228: The third terminal device acquires an arrangement order of the data in the third data set.

According to some embodiments, the third terminal device can acquire an arrangement order of the data in the third data set. The arrangement order is the arrangement order of the data in the third data set. Here, the arrangement order of the data is not necessarily a fixed order. For example, when the data included in the third data set changes, the arrangement order of the data can also change accordingly. Here, the arrangement order of the data includes, but is not limited to, a forward order or a reverse order.

S230: The third terminal device acquires plaintext data corresponding to the second intersection data from the third data set based on the arrangement order.

In some embodiments, when the third terminal device obtains the arrangement order of the data in the third data set, the third terminal device can acquire the plaintext data corresponding to the second intersection data from the third data set. In other words, the data in the third data set is plaintext data, and the third terminal device can acquire the plaintext data corresponding to the second intersection data.

According to some embodiments, the plaintext data is data not encrypted in the third terminal device. The plaintext data in some embodiments of this specification is unencrypted data corresponding to the second intersection data. For example, the third terminal device acquires the plaintext data corresponding to the second intersection data $E''_2 \cap (E''_0 \cap E''_1)$ from the third data set based on the arrangement order.

S232: The third terminal device sends the plaintext data corresponding to the second intersection data to the first terminal device and the second terminal device.

In some embodiments, when the third terminal device acquires the plaintext data corresponding to the second intersection data from the third data set based on the arrangement order, the third terminal device can send the plaintext data corresponding to the second intersection data to the first terminal device and the second terminal device. For example, the third terminal device acquires the plaintext data corresponding to the second intersection data $E''_2 \cap (E''_0 \cap E''_1)$ from the third data set based on the arrangement order, and the third terminal device sends the plaintext data corresponding to the second intersection data $E''_2 \cap (E''_0 \cap E''_1)$ to the first terminal device and the second terminal device.

Here, an execution sequence of step 222 and steps 208-224 is not limited. In other words, the third terminal device can acquire the fifth encrypted data sent by the first terminal device before the second terminal device acquires the first encrypted data, or before any one of steps 208-224 is performed.

According to some embodiments, the multi-party private set intersection protocol can be, for example, a four-party private set intersection protocol. The four terminal devices can be, for example, a first terminal device, a second terminal device, a third terminal device, and a fourth terminal device. The first terminal device can send the first encrypted data to the second terminal device, the second terminal device acquires the first random sequence data corresponding to the second encrypted data, the second terminal device acquires the second random sequence data corresponding to the third encrypted data, and the second terminal device sends the first random sequence data and the second random sequence data to the first terminal device. The second encrypted data is obtained by the second terminal device by encrypting the first encrypted data by using the second public key, and the third encrypted data is obtained by the second terminal device by encrypting the second data set by using the second public key. The first terminal device can determine the first intersection data based on the first random sequence data and the second random sequence data. The first terminal device can send the first intersection data to the third terminal device. The third terminal device can encrypt the first intersection data by using the third public key to obtain the second intersection data, and the third terminal device can encrypt the third data set by using the third public key to obtain the fourth encrypted data. The third terminal device can send the second intersection data and the fourth encrypted data to the first terminal device. The first terminal device can determine the third intersection data based on the second intersection data and the fourth encrypted data. The first terminal device can send the third intersection data to the fourth terminal device. The fourth terminal device can acquire third intersection data and fifth encrypted data sent by the first terminal device. The fifth encrypted data is obtained based on a fourth data set in the fourth terminal device, the first public key, the second public key, the third public key, and a fourth public key. The fourth terminal device can determine the fourth intersection data based on the third intersection data and the fifth encrypted data, and send the fourth intersection data to the first terminal device, the second terminal device, and the third terminal device.

In some embodiments of this specification, the first terminal device generates the first public key by using the elliptic curve parameter information, the second terminal device generates the second public key by using the elliptic curve parameter information, and the third terminal device generates the third public key by using the elliptic curve parameter information so that the security of the public key generation can be improved, and the security of the data determination can be improved. Moreover, the first terminal device sends the first encrypted data to the second terminal device, the second terminal device encrypts the first encrypted data by using the second public key to obtain the second encrypted data, the second terminal device acquires the first random sequence data corresponding to the second encrypted data, the second terminal device acquires the second random sequence data corresponding to the third encrypted data, and the second terminal device sends the first random sequence data and the second random sequence data to the first terminal device so that the probability that the first terminal device obtains the intersection data between the first data set and the second data set can be reduced, the intersection data between the data sets of any two terminal devices obtained by the terminal device in the multi-party transaction protocol can be reduced, and the accuracy of data determination in the multi-party transaction protocol can be improved. In addition, the first terminal device encrypts the second random sequence data by using the first public key to obtain the third random sequence data, the first terminal device acquires the first intersection data of the first random sequence data and the third random sequence data, and sends the first intersection data to the third terminal device, the third terminal device acquires the fifth encrypted data sent by the first terminal device, the third terminal device encrypts the first intersection data by using the third public key to obtain the third intersection data, and the third terminal device acquires the intersection data of the fifth encrypted data and the third intersection data to obtain the second intersection data. Therefore, in the data determination process, the public key of each terminal device is used to encrypt the data without using a mature symmetric cryptography primitive, the network bandwidth requirement is low, and the immature homomorphic encryption is not needed. As such, low security problem can be alleviated, the security of the data determination can be improved, the network bandwidth requirement, the hardware requirement, and the security requirement can all be met, and the convenience of using the multi-party private set intersection protocol can be improved. Finally, the third terminal device acquires the arrangement order of the data in the third data set, the third terminal device acquires the plaintext data corresponding to the second intersection data from the third data set based on the arrangement order, and the third terminal device sends the plaintext data corresponding to the second intersection data to the first terminal device and the second terminal device. In other words, the third terminal device can obtain the intersection data of the first data set, the second data set, and the third data set so that the accuracy of data determination can be improved and the convenience of data access in the multi-party transaction protocol can be improved.

Figure 4:
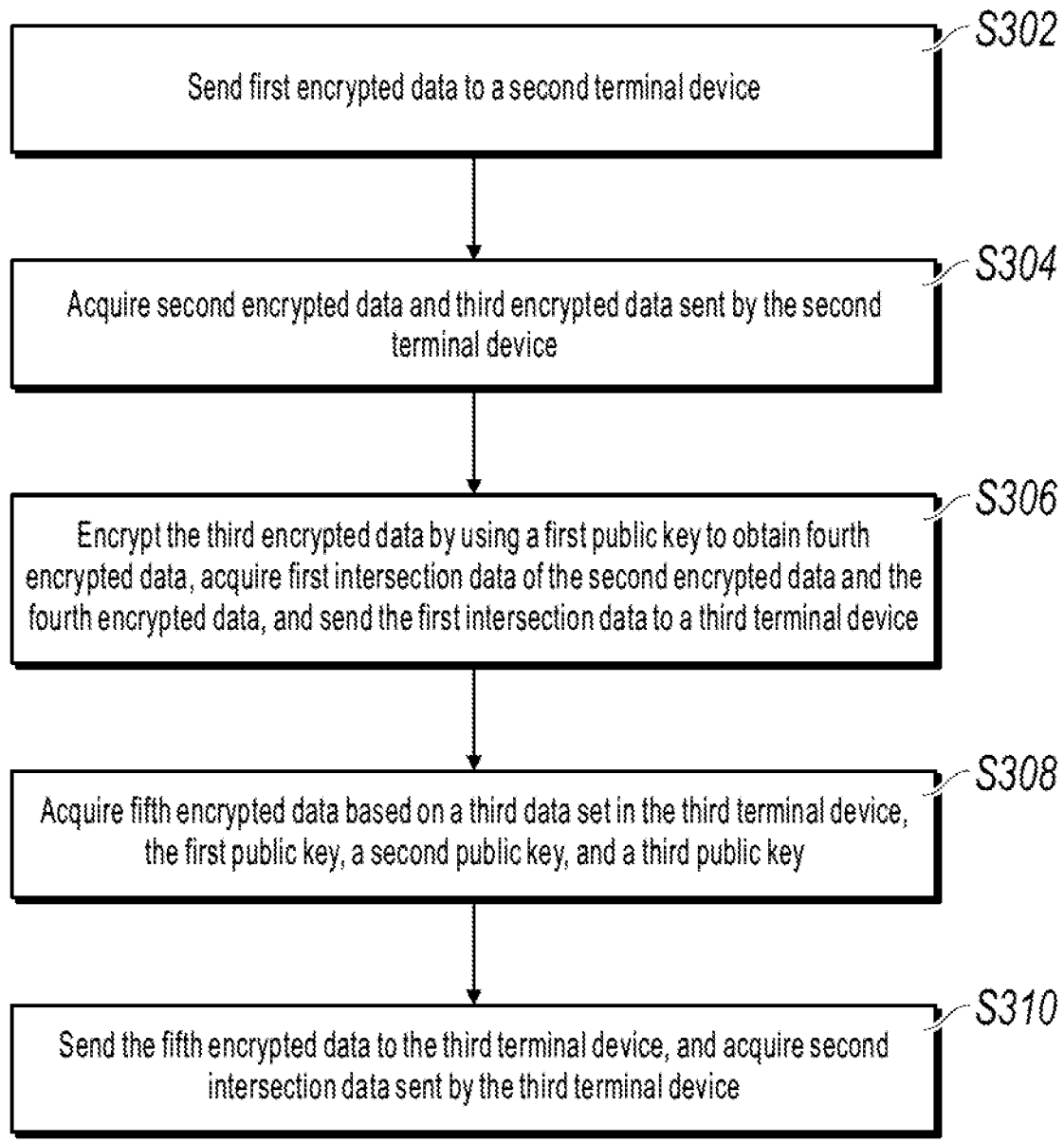
FIG. 4 is a schematic flowchart illustrating a data determination method, according to some embodiments of this specification.

FIG. 4 is a schematic flowchart illustrating a data determination method, according to some embodiments of this specification. As shown in FIG. 4, some embodiments of this specification are described from the first terminal device side. The method can include the following steps S302 to S310.

S302: Send first encrypted data to a second terminal device.

In some embodiments, a quantity of terminal devices in some embodiments of this specification is at least three. For example, the quantity of terminal devices can be three. The execution body of some embodiments of this specification is a first terminal device.

According to some embodiments, the first encrypted data is obtained by the first terminal device by encrypting a first data set in the first terminal device by using a first public key. The first data set is a data set stored in the first terminal device. The first data set is not necessarily a fixed data set. For example, when the type of data included in the first data set changes, the first data set can also change accordingly. For example, when the amount of data included in the first data set changes, the first data set can also change accordingly.

In some embodiments, the first terminal device can encrypt the first data set in the first terminal device by using the first public key to obtain the first encrypted data. When the first terminal device obtains the first encrypted data, the first terminal device can send the first encrypted data to the second terminal device.

S304: Acquire second encrypted data and third encrypted data sent by the second terminal device.

According to some embodiments, the second encrypted data is obtained based on the first encrypted data and the second public key, and the third encrypted data is obtained based on the second public key and the second data set in the second terminal device. The second public key is a public key generated by the second terminal device based on elliptic curve parameters. The second public key is not necessarily a fixed public key. For example, when the second private key acquired by the second terminal device changes, the second public key generated by the second terminal device based on the second private key can change accordingly.

In some embodiments, the second encrypted data is obtained by the second terminal device after obtaining the first encrypted data sent by the first terminal device and encrypting the first encrypted data by using the second public key. The second encrypted data is not necessarily fixed data. For example, when the first encrypted data or the second public key changes, the second encrypted data can also change accordingly.

Optionally, the third encrypted data is obtained by the second terminal device by encrypting the second data set in the second terminal device by using the second public key. The second data set is a data set stored in the second terminal device. The second data set is not necessarily a fixed data set. For example, when the type of data included in the second data set changes, the second data set can also change accordingly. For example, when the amount of data included in the second data set changes, the second data set can also change accordingly.

In some embodiments, the first terminal device can encrypt the first data set in the first terminal device by using the first public key to obtain the first encrypted data. When the first terminal device obtains the first encrypted data, the first terminal device can send the first encrypted data to the second terminal device. The second terminal device can acquire the first encrypted data sent by the first terminal device, and the second terminal device can encrypt the first encrypted data by using the second public key to obtain the second encrypted data. The second terminal device can also encrypt the second data set in the second terminal device by using the second public key to obtain third encrypted data, and the second terminal device can send the second encrypted data and the third encrypted data to the first terminal device. The first terminal device can acquire the second encrypted data and the third encrypted data sent by the second terminal device.

S306: Encrypt the third encrypted data by using the first public key to obtain fourth encrypted data, acquire first intersection data of the second encrypted data and the fourth encrypted data, and send the first intersection data to the third terminal device.

According to some embodiments, the fourth encrypted data is data obtained by the first terminal device by encrypting the third encrypted data sent by the second terminal device by using the first public key. The fourth encrypted data is not necessarily fixed data. For example, when the first public key or the third encrypted data changes, the fourth encrypted data can change accordingly.

In some embodiments, the first intersection data is intersection data between the first data set in the first terminal device and the second data set in the second terminal device that are determined by the first terminal device. The first intersection data is used to indicate a data intersection between the first data set and the second data set, the first intersection data includes at least one piece of data, i.e., the first intersection data includes an amount of data that is not necessarily fixed data.

It will be readily understood that, the first intersection data is not necessarily fixed data. For example, when the type of data included in the first intersection data changes, the first intersection data can also change accordingly. For example, when the amount of data included in the first intersection data changes, the first intersection data can also change accordingly.

In some embodiments, the third terminal device is a terminal device in a multi-party transaction protocol for determining intersection data in a multi-party data set. The third terminal device is not necessarily a fixed terminal device. For example, when an identifier of the third terminal device changes, the third terminal device can change accordingly.

According to some embodiments, when the first terminal device obtains the second encrypted data and the third encrypted data sent by the second terminal device, the first terminal device encrypts the third encrypted data by using the first public key to obtain the fourth encrypted data, acquires the first intersection data of the second encrypted data and the fourth encrypted data, and sends the first intersection data to the third terminal device.

S308: Acquire fifth encrypted data based on a third data set in the third terminal device, the first public key, the second public key, and a third public key.

According to some embodiments, the first terminal device can acquire the fifth encrypted data based on the third data set in the third terminal device, the first public key, the second public key, and the third public key.

Specifically, for example, the third terminal device can encrypt the third data set in the third terminal device by using the third public key to obtain sixth encrypted data, and the third terminal device sends the sixth encrypted data to the second terminal device. The second terminal device encrypts the sixth encrypted data by using the second public key to obtain seventh encrypted data, and the second terminal device sends the seventh encrypted data to the first terminal device. The first terminal device encrypts the seventh encrypted data by using the first public key to obtain the fifth encrypted data.

S310: Send the fifth encrypted data to the third terminal device, and acquire second intersection data sent by the third terminal device.

According to some embodiments, when the first terminal device obtains the fifth encrypted data based on the third data set in the third terminal device, the first public key, the second public key, and the third public key, the first terminal device can send the fifth encrypted data and the first intersection data to the third terminal device. The third terminal device can acquire the fifth encrypted data and the first intersection data sent by the first terminal device. The third terminal device can determine the second intersection data based on the fifth encrypted data and the first intersection data, and send the second intersection data to the first terminal device and the second terminal device. The first terminal device can acquire the second intersection data sent by the third terminal device.

An execution sequence of step S302 and step S308 is not limited. For example, the first terminal device can acquire the fifth encrypted data and send the first encrypted data to the second terminal device based on the third data set in the third terminal device, the first public key, the second public key, and the third public key. Alternatively, for example, the first terminal device can first acquire the fifth encrypted data based on the third data set in the third terminal device, the first public key, the second public key, and the third public key, and then send the first encrypted data to the second terminal device.

In some embodiments of this specification, the first terminal device can send the first encrypted data to the second terminal device, acquire the second encrypted data and the third encrypted data sent by the second terminal device, encrypt the third encrypted data by using the first public key to obtain the fourth encrypted data, acquire the first intersection data of the second encrypted data and the fourth encrypted data, send the first intersection data to the third terminal device, acquire the fifth encrypted data based on the third data set in the third terminal device, the first public key, the second public key, and the third public key, send the fifth encrypted data to the third terminal device, and acquire the second intersection data sent by the third terminal device. Therefore, in the data determination process, the public key of each terminal device is used to encrypt the data without using a mature symmetric cryptography primitive, the network bandwidth requirement is low, and the immature homomorphic encryption is not needed. As such, low security problem can be alleviated, the security of the data determination can be improved, the network bandwidth requirement, the hardware requirement, and the security requirement can all be met, and the convenience of using the multi-party private set intersection protocol can be improved.

Figure 5:
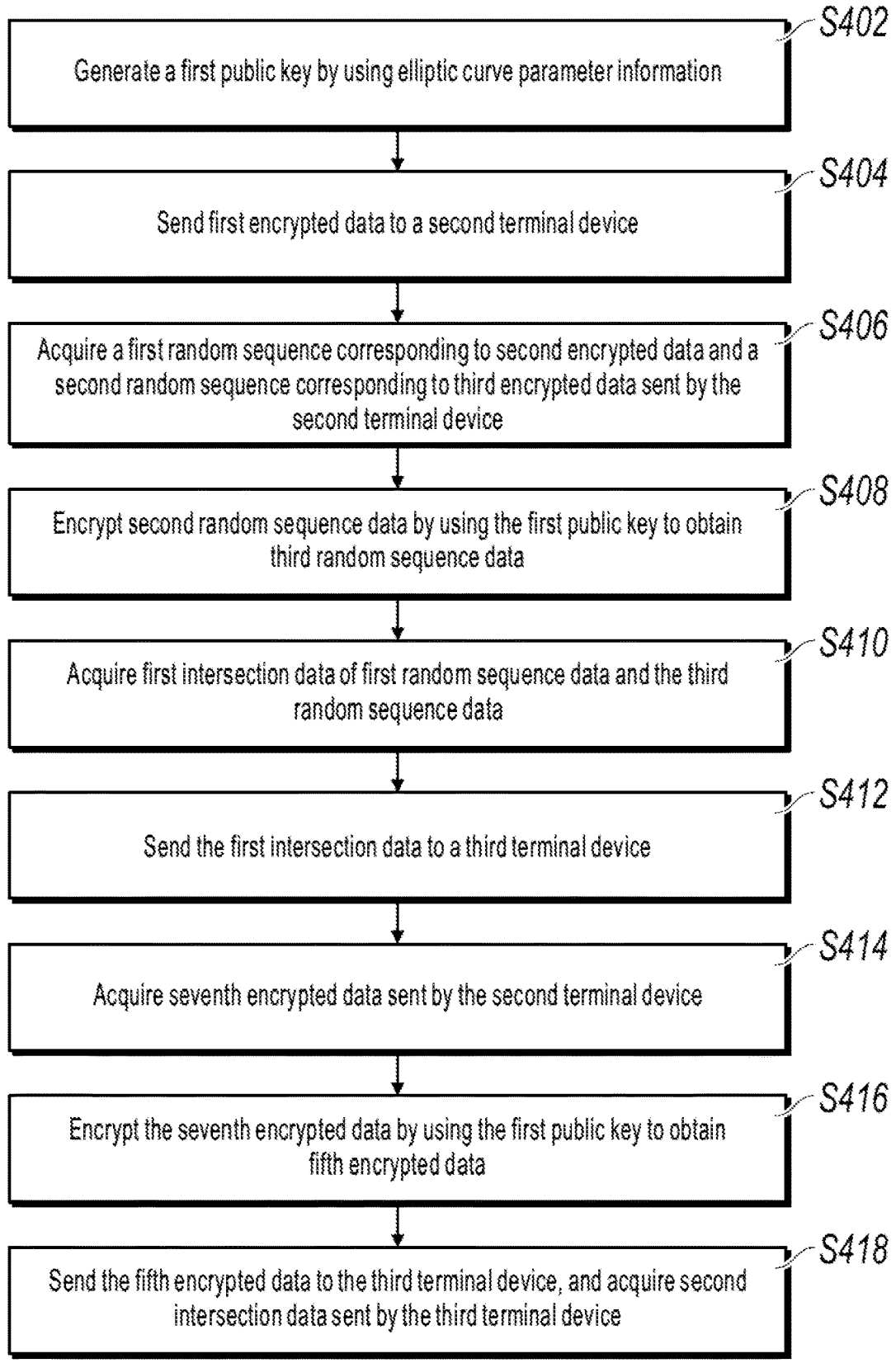
FIG. 5 is a schematic flowchart illustrating a data determination method, according to some embodiments of this specification.

FIG. 5 is a schematic flowchart illustrating a data determination method, according to some embodiments of this specification. As shown in FIG. 5, some embodiments of this specification are described from the first terminal device side. The method can include the following steps S402 to S418.

S402: Generate the first public key by using elliptic curve parameter information.

According to some embodiments, elliptic curve cryptography is a cryptographic algorithm based on the elliptic curve problem in the finite field. Based on elliptic curve cryptography, cryptographic primitives such as key exchange protocols, digital signatures, and asymmetric encryption can be implemented. Compared with conventional finite-field cryptography (e.g., RSA), elliptic curve cryptography can have a shorter key length at the same security level than conventional finite-field cryptography, and therefore has a wide range of application scenarios in reality.

In some embodiments, elliptic curves can be represented using the form of Formula (1), where a and b are constants and $4a^3+27b^2 \neq 0$.

To further use elliptic curve cryptography, the following parameters can also be obtained: a prime number p; a base point G; a subgroup order n; and a subgroup co-factor h.

Thus, the main parameters of the elliptic curve cryptography algorithm can be summarized as (p, a, b, G, n, h), that is, for example, i.e., elliptic curve parameters include, but are not limited to, a prime number p, a base point G, a subgroup order n, a subgroup co-factor h, a constant a, a constant b, etc.

In some embodiments, the first terminal device can generate the first key based on a random number and the base point G. Since the random number is not fixed to a specific value, the first key is not necessarily a fixed key. The first terminal device can generate the first public key by using elliptic curve parameter information. When the first terminal device generates the first public key based on the elliptic curve parameter information, the first terminal device can generate the first public key $d_0$ by using the first private key and the base point G.

S404: Send first encrypted data to a second terminal device.

A specific process has been described above, and details are omitted for simplicity.

In some embodiments, the first data set can be, for example, $X_0 \in F^n$, where $X_0$ includes n elements. The first encrypted data can be, for example, $E_0$ obtained by the first terminal device by encrypting the first data set $X_0$ by using the first public key $d_0$.

S406: Acquire a first random sequence corresponding to the second encrypted data and a second random sequence corresponding to the third encrypted data that are sent by the second terminal device.

In some embodiments, the first random sequence data is data obtained by the second terminal device after random shuffling of the second encrypted data. The first random sequence data is not necessarily fixed data. Since the second terminal device randomly shuffles the second encrypted data and the order of the shuffling is uncertain, the first random sequence data is not fixed.

According to some embodiments, when the second terminal device obtains the second encrypted data, the second terminal device can obtain the first random sequence data corresponding to the second encrypted data. For example, the second terminal device can acquire the first random sequence data $\pi(E'_0)$ corresponding to the second encrypted data $E'_0$.

In some embodiments, the second random sequence data is data obtained by the second terminal device after random shuffling of the third encrypted data. The second random sequence data is not necessarily fixed data. Since the second terminal device randomly shuffles the third encrypted data and the order of the shuffling is uncertain, the second random sequence data is not fixed.

According to some embodiments, when the second terminal device obtains the third encrypted data, the second terminal device can obtain the second random sequence data corresponding to the third encrypted data. For example, the second terminal device can acquire the second random sequence data $\pi(E_1)$ corresponding to the third encrypted data $E_1$. The second data set can be, for example, $X_1 \in F^n$, where $X_1$ includes n elements. The third encrypted data $E_1$ can, for example, be obtained by the second terminal device by encrypting the second data set $X_1$ by using the second public key $d_1$.

According to some embodiments, when the second terminal device obtains the first random sequence data corresponding to the second encrypted data and obtains the second random sequence data corresponding to the third encrypted data, the second terminal device can send the first random sequence data and the second random sequence data to the first terminal device. The first terminal device can acquire the first random sequence corresponding to the second encrypted data and the second random sequence corresponding to the third encrypted data that are sent by the second terminal device.

S408: Encrypt the second random sequence data by using the first public key to obtain third random sequence data.

According to some embodiments, the third random sequence data is data obtained after the first terminal device encrypts the second random sequence data. The third random sequence data is not necessarily fixed data. For example, when the order of random shuffling changes or the first public key changes, the third random sequence can also change accordingly.

When the second terminal device obtains the first random sequence data corresponding to the second encrypted data and obtains the second random sequence data corresponding to the third encrypted data, the second terminal device can send the first random sequence data and the second random sequence data to the first terminal device. The first terminal device can acquire the first random sequence data and the second random sequence data, and the first terminal device can encrypt the second random sequence data by using the first public key to obtain the third random sequence data.

In some embodiments, when the second terminal device obtains the first random sequence data $\pi(E'_0)$ corresponding to the second encrypted data $E'_0$ and the second random sequence data $\pi(E_1)$ corresponding to the third encrypted data $E_1$, the second terminal device can send the first random sequence data $\pi(E'_0)$ and the second random sequence data $\pi(E_1)$ to the first terminal device. The first terminal device can encrypt the second random sequence data $\pi(E_1)$ by using the first public key $d_0$ to obtain the third random sequence data $\pi(E'_1)$.

S410: Acquire first intersection data of the first random sequence data and the third random sequence data.

According to some embodiments, when the first terminal device obtains the first random sequence data and the third random sequence data, the first terminal device can acquire the first intersection data of the first random sequence data and the third random sequence data.

In some embodiments, when the second terminal device obtains the first random sequence data $\pi(E'_0)$ corresponding to the second encrypted data $E'_0$ and the second random sequence data $\pi(E_1)$ corresponding to the third encrypted data $E_1$, the second terminal device can send the first random sequence data $\pi(E'_0)$ and the second random sequence data $\pi(E_1)$ to the first terminal device. The first terminal device can encrypt the second random sequence data $\pi(E_1)$ by using the first public key $d_0$ to obtain the third random sequence data $\pi(E'_1)$. The first terminal device can acquire the first intersection data $E'_0 \cap E'_1$ of the first random sequence data $\pi(E'_0)$ and the third random sequence data $\pi(E'_1)$, and send $E'_0 \cap E'_1$ to the third terminal device.

S412: Send the first intersection data to the third terminal device.

According to some embodiments, the first terminal device can acquire the first intersection data of the first random sequence data and the third random sequence data, and send the first intersection data to the third terminal device. For example, the first terminal device can acquire the first intersection data $E'_0 \cap E'_1$ of the first random sequence data $\pi(E'_0)$ and the third random sequence data $\pi(E'_1)$, and send $E'_0 \cap E'_1$ to the third terminal device.

S414: Acquire seventh encrypted data sent by the second terminal device.

In some embodiments, the seventh encrypted data is obtained by the second terminal device by encrypting the sixth encrypted data by using the second public key, and the sixth encrypted data is obtained by the third terminal device by encrypting the third data set in the third terminal device by using the third public key. The sixth encrypted data is not necessarily fixed encrypted data. For example, when the third public key or the third data set changes, the sixth encrypted data can also change accordingly. The seventh encrypted data is not necessarily fixed encrypted data. For example, when the second public key or the third data set changes, the sixth encrypted data can also change accordingly, and the seventh encrypted data can also change accordingly.

According to some embodiments, the third data set can be, for example, $X_2 \in F^n$, where $X_2$ includes n elements. The sixth encrypted data $E_2$ can, for example, be obtained by the third terminal device by encrypting the third data set $X_2$ by using the third public key $d_2$. The third terminal device can send the sixth encrypted data $E_2$ to the second terminal device. The second terminal device can encrypt the sixth encrypted data $E_2$ by using the second public key $d_1$ to obtain the seventh encrypted data $E'_2$. The second terminal device can send the seventh encrypted data $E'_2$ to the first terminal device.

S416: Encrypt the seventh encrypted data by using the first public key to obtain the fifth encrypted data.

In some embodiments, the second terminal device sends the seventh encrypted data to the first terminal device. The first terminal device encrypts the seventh encrypted data by using the first public key to obtain fifth encrypted data, and the first terminal device sends the fifth encrypted data to the third terminal device. For example, the first terminal device can encrypt the seventh encrypted data $E'_2$ by using the first public key $d_0$ to obtain the fifth encrypted data $E''_2$. The first terminal device can send the fifth encrypted data $E''_2$ to the third terminal device.

S418: Send the fifth encrypted data to the third terminal device, and acquire second intersection data sent by the third terminal device.

A specific process has been described above, and details are omitted for simplicity.

In some embodiments of this specification, the first terminal device can generate the first public key by using the elliptic curve parameter information, thereby improving the security of public key generation and improving the security of data determination. In addition, the first terminal device sends the first encrypted data to the second terminal device, acquires the first random sequence corresponding to the second encrypted data and the second random sequence corresponding to the third encrypted data that are sent by the second terminal device, encrypts the second random sequence data by using the first public key to obtain the third random sequence data, and acquires the first intersection data of the first random sequence data and the third random sequence data so that the probability that the first terminal device obtains the intersection data between the first data set and the second data set can be reduced, the intersection data between the data sets of any two terminal devices obtained by the terminal device in the multi-party transaction protocol can be reduced, and the accuracy of data determination in the multi-party transaction protocol can be improved. Finally, the first terminal device acquires the seventh encrypted data sent by the second terminal device, encrypts the seventh encrypted data by using the first public key to obtain the fifth encrypted data, and sends the fifth encrypted data to the third terminal device. Since the fifth encrypted data is not random sequence data, the third terminal device can acquire the plaintext data corresponding to the intersection of the first data set, the second data set, and the third data set, thereby improving the convenience of data determination. Finally, the first terminal device can acquire the second intersection data sent by the third terminal. In the data determination process, the public key of each terminal device is used to encrypt the data without using a mature symmetric cryptography primitive, the network bandwidth requirement is low, and the immature homomorphic encryption is not needed. As such, low security problem can be alleviated, the security of the data determination can be improved, the network bandwidth requirement, the hardware requirement, and the security requirement can all be met, and the convenience of using the multi-party private set intersection protocol can be improved.

Figure 6:
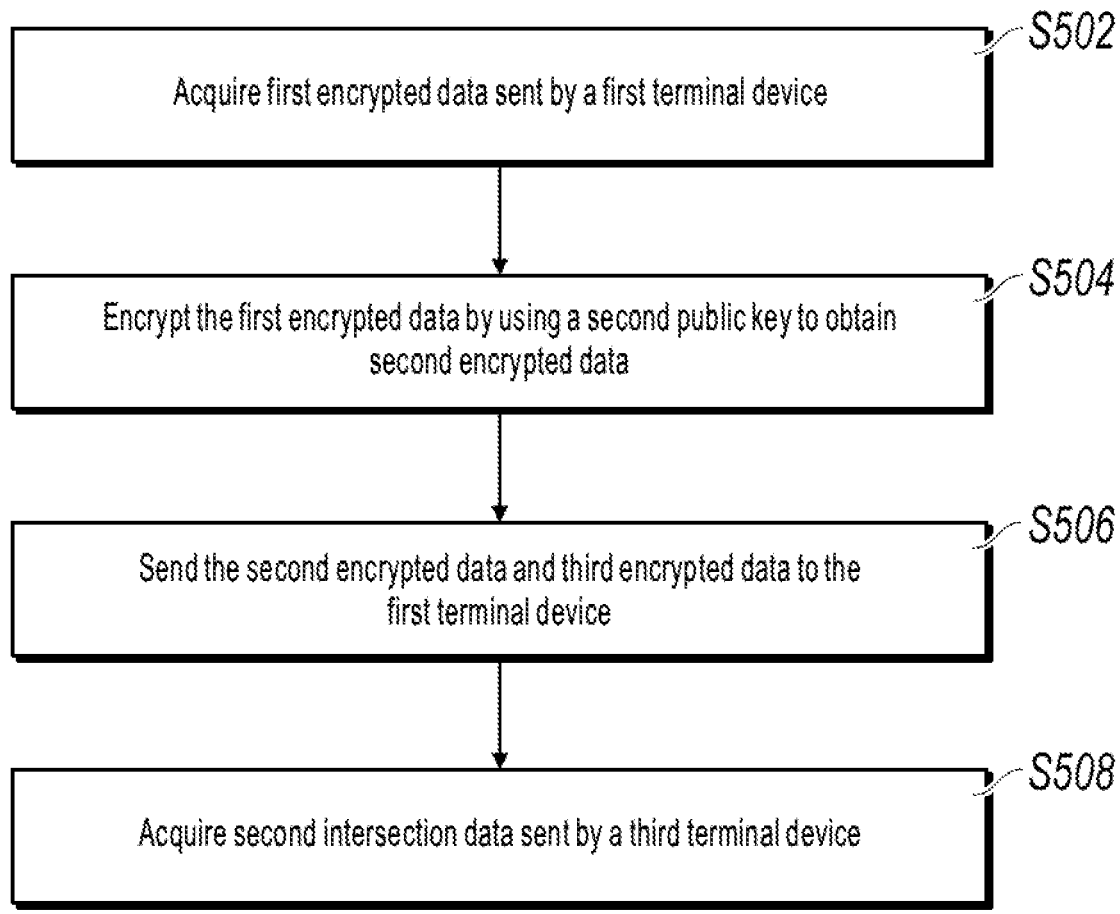
FIG. 6 is a schematic flowchart illustrating a data determination method, according to some embodiments of this specification.

FIG. 6 is a schematic flowchart illustrating a data determination method, according to some embodiments of this specification. As shown in FIG. 6, some embodiments of this specification are described from the second terminal device side. The method can include the following steps S502 to S508.

S502: Acquire first encrypted data sent by the first terminal device.

According to some embodiments, the second terminal device is a terminal device in a multi-party transaction protocol that receives the first encrypted data. The second terminal device is not necessarily a fixed terminal device. For example, there can be multiple second terminal devices in a multi-party private set intersection protocol.

In some embodiments, the first encrypted data is obtained by the first terminal device by encrypting the first data set in the first terminal device by using the first public key. The first data set is a data set stored in the first terminal device. The first data set is not necessarily a fixed data set. For example, when the type of data included in the first data set changes, the first data set can also change accordingly. For example, when the amount of data included in the first data set changes, the first data set can also change accordingly.

In some embodiments, the first terminal device can encrypt the first data set in the first terminal device by using the first public key to obtain the first encrypted data. When the first terminal device obtains the first encrypted data, the first terminal device can send the first encrypted data to the second terminal device. The second terminal device can acquire the first encrypted data sent by the first terminal device.

S504: Encrypt the first encrypted data by using the second public key to obtain second encrypted data.

In some embodiments, the second public key is a public key generated by the second terminal device based on elliptic curve parameters. The second public key is not necessarily a fixed public key. For example, when the second private key acquired by the second terminal device changes, the second public key generated by the second terminal device based on the second private key can change accordingly.

It will be readily understood that the second encrypted data is obtained by the second terminal device after obtaining the first encrypted data sent by the first terminal device and encrypting the first encrypted data by using the second public key. The second encrypted data is not necessarily fixed data. For example, when the first encrypted data or the second public key changes, the second encrypted data can also change accordingly.

In some embodiments, the first terminal device can encrypt the first data set in the first terminal device by using the first public key to obtain the first encrypted data. When the first terminal device obtains the first encrypted data, the first terminal device can send the first encrypted data to the second terminal device. The second terminal device can acquire the first encrypted data sent by the first terminal device, and the second terminal device can encrypt the first encrypted data by using the second public key to obtain the second encrypted data.

S506: Send the second encrypted data and the third encrypted data to the first terminal device.

According to some embodiments, the third encrypted data is obtained by the second terminal device by encrypting a second data set in the second terminal device by using a second public key, and the second data set is a data set stored in the second terminal device. The second data set is not necessarily a fixed data set. For example, when the type of data included in the second data set changes, the second data set can also change accordingly. For example, when the amount of data included in the second data set changes, the second data set can also change accordingly.

In some embodiments, when the second terminal device obtains the second encrypted data and the third encrypted data, the second terminal device can send the second encrypted data and the third encrypted data to the first terminal device. The second encrypted data and the third encrypted data are used to instruct the first terminal device to acquire the first intersection data based on the second encrypted data and the third encrypted data, and send the first intersection data to the third terminal device. In other words, when the first terminal device obtains the second encrypted data and the third encrypted data, the first terminal device can acquire the first intersection data based on the second encrypted data and the third encrypted data, and send the first intersection data to the third terminal device.

S508: Acquire second intersection data sent by the third terminal device.

According to some embodiments, the second intersection data is determined by the third terminal device based on the first intersection data and the fifth encrypted data, and the fifth encrypted data is obtained based on a third data set in the third terminal device, the first public key, the second public key, and a third public key. When the third terminal device determines the second intersection data based on the first intersection data and the fifth encrypted data, the third terminal device can send the second intersection data to the second terminal device, and the second terminal device can obtain the second intersection data sent by the third terminal device.

In some embodiments of this specification, the second terminal device can acquire the first encrypted data sent by the first terminal device, encrypt the first encrypted data by using the second public key to obtain the second encrypted data, and send the second encrypted data and the third encrypted data to the first terminal device to acquire the second intersection data sent by the third terminal device. Therefore, in the data determination process, the public key of each terminal device is used to encrypt the data without using a mature symmetric cryptography primitive, the network bandwidth requirement is low, and the immature homomorphic encryption is not needed. As such, low security problem can be alleviated, the security of the data determination can be improved, the network bandwidth requirement, the hardware requirement, and the security requirement can all be met, and the convenience of using the multi-party private set intersection protocol can be improved.

Figure 7:
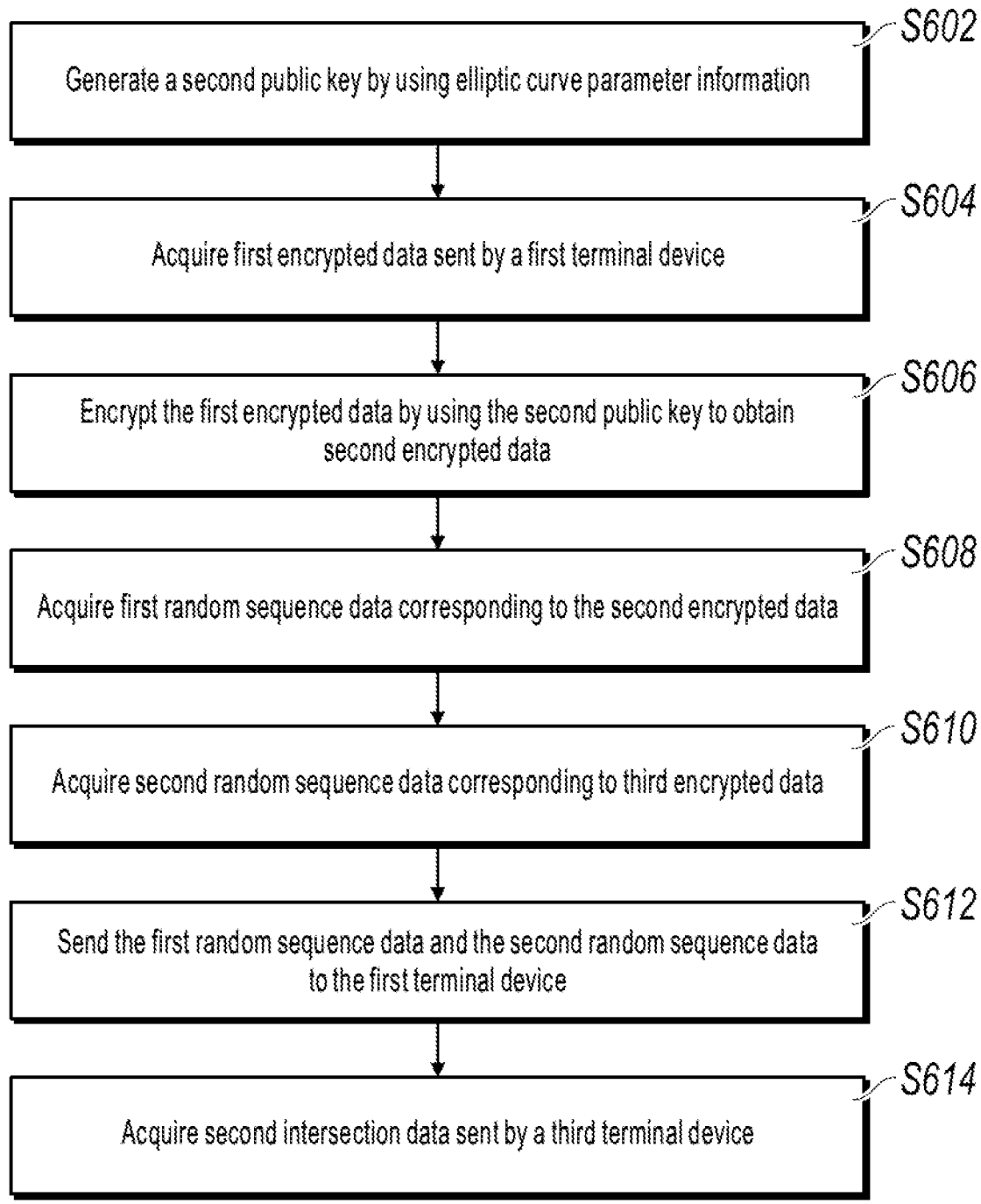
FIG. 7 is a schematic flowchart illustrating a data determination method, according to some embodiments of this specification.

FIG. 7 is a schematic flowchart illustrating a data determination method, according to some embodiments of this specification. As shown in FIG. 7, some embodiments of this specification are described from the second terminal device side. The method can include the following steps S602 to S614.

S602: Generate the second public key by using elliptic curve parameter information.

In some embodiments, the second public key is a public key generated by the second terminal device. The second terminal device can generate the second public key by using the elliptic curve parameter information. For example, when the second terminal device generates the second public key based on the elliptic curve parameter information, the second terminal device can generate the second public key $d_1$ by using the second private key and the base point G. The second private key can be generated by the second terminal device based on the random number and the base point G.

S604: Acquire first encrypted data sent by the first terminal device.

A specific process has been described above, and details are omitted for simplicity.

In some embodiments, the first data set can be, for example, $X_0 \in F^n$, where $X_0$ includes n elements. The first encrypted data can be, for example, $E_0$ obtained by the first terminal device by encrypting the first data set $X_0$ by using the first public key $d_0$. The second terminal device can acquire the first encrypted data $E_0$ sent by the first terminal device.

S606: Encrypt the first encrypted data by using the second public key to obtain second encrypted data.

A specific process has been described above, and details are omitted for simplicity.

In some embodiments, the first data set can be, for example, $X_0 \in F^n$, where $X_0$ includes n elements. The first encrypted data can be, for example, $E_0$ obtained by the first terminal device by encrypting the first data set $X_0$ by using the first public key $d_0$. When obtaining the first encrypted data $E_0$ sent by the first terminal device, the second terminal device can encrypt the first encrypted data $E_0$ by using the second public key $d_1$ to obtain the second encrypted data $E'_0$.

S608: Acquire first random sequence data corresponding to the second encrypted data.

In some embodiments, the first random sequence data is data obtained after random shuffling of the second encrypted data. The first random sequence data is not necessarily fixed data. Since the second terminal device randomly shuffles the second encrypted data and the order of the shuffling is uncertain, the first random sequence data is not fixed.

According to some embodiments, when the second terminal device obtains the second encrypted data, the second terminal device can obtain the first random sequence data corresponding to the second encrypted data. For example, the second terminal device can acquire the first random sequence data $\pi(E'_0)$ corresponding to the second encrypted data $E'_0$.

S610: Acquire second random sequence data corresponding to the third encrypted data.

In some embodiments, the second random sequence data is data obtained after random shuffling of the third encrypted data. The second random sequence data is not necessarily fixed data. Since the second terminal device randomly shuffles the third encrypted data and the order of the shuffling is uncertain, the second random sequence data is not fixed.

According to some embodiments, when the second terminal device obtains the third encrypted data, the second terminal device can obtain the second random sequence data corresponding to the third encrypted data. For example, the second terminal device can acquire the second random sequence data $\pi(E_1)$ corresponding to the third encrypted data $E_1$. The second data set can be, for example, $X_1 \in F^n$, where $X_1$ includes n elements. The third encrypted data $E_1$ can, for example, be obtained by the second terminal device by encrypting the second data set $X_1$ by using the second public key $d_1$.

S612: Send the first random sequence data and the second random sequence data to the first terminal device.

According to some embodiments, when the second terminal device obtains the first random sequence data corresponding to the second encrypted data and obtains the second random sequence data corresponding to the third encrypted data, the second terminal device can send the first random sequence data and the second random sequence data to the first terminal device.

In some embodiments, when the second terminal device obtains the first random sequence data $\pi(E'_0)$ corresponding to the second encrypted data $E'_0$ and the second random sequence data $\pi(E_1)$ corresponding to the third encrypted data $E_1$, the second terminal device can send the first random sequence data $\pi(E'_0)$ and the second random sequence data $\pi(E_1)$ to the first terminal device.

According to some embodiments, the first random sequence data and the second random sequence data are used to instruct the first terminal device to encrypt the second random sequence data by using the first public key to obtain the third random sequence data, and acquire the first intersection data of the first random sequence data and the third random sequence data. In other words, when the first terminal device obtains the first random sequence data and the second random sequence data, the first terminal device can encrypt the second random sequence data by using the first public key to obtain the third random sequence data, and the first terminal device can acquire the first intersection data of the first random sequence data and the third random sequence data, and send the first intersection data to the third terminal device.

S614: Acquire second intersection data sent by the third terminal device.

A specific process has been described above, and details are omitted for simplicity.

In some embodiments, the second intersection data is determined by the third terminal device based on the first intersection data and the fifth encrypted data, and the fifth encrypted data is obtained based on a third data set in the third terminal device, the first public key, the second public key, and a third public key.

According to some embodiments, before acquiring the second intersection data sent by the third terminal device, the second terminal device can acquire sixth encrypted data sent by the third terminal device. The sixth encrypted data is obtained by the third terminal device by encrypting the third data set in the third terminal device by using the third public key. The second terminal device can encrypt the sixth encrypted data by using the second public key to obtain the seventh encrypted data. The second terminal device can send the seventh encrypted data to the first terminal device, and the first terminal device can encrypt the seventh encrypted data by using the first public key to obtain the fifth encrypted data. The first terminal device can send the fifth encrypted data to the third terminal device. The third terminal device encrypts the first intersection data by using the third public key to obtain the third intersection data, the third terminal device acquires the intersection data of the fifth encrypted data and the third intersection data to obtain the second intersection data, and sends the second intersection data to the second terminal device, and the second terminal device can obtain the second intersection data sent by the third terminal device.

In some embodiments of this specification, the second terminal device can generate the second public key by using the elliptic curve parameter information, thereby improving the security of public key generation and improving the security of data determination. Moreover, the second terminal device acquires the first encrypted data sent by the first terminal device, encrypts the first encrypted data by using the second public key to obtain the second encrypted data, acquires the first random sequence data corresponding to the second encrypted data, acquires the second random sequence data corresponding to the third encrypted data, and sends the first random sequence data and the second random sequence data to the first terminal device so that the probability that the first terminal device obtains the intersection data between the first data set and the second data set can be reduced, the intersection data between the data sets of any two terminal devices obtained by the terminal device in the multi-party transaction protocol can be reduced, and the accuracy of data determination in the multi-party transaction protocol can be improved. Finally, the first terminal device can acquire the second intersection data sent by the third terminal. In the data determination process, the public key of each terminal device is used to encrypt the data without using a mature symmetric cryptography primitive, the network bandwidth requirement is low, and the immature homomorphic encryption is not needed. As such, low security problem can be alleviated, the security of the data determination can be improved, the network bandwidth requirement, the hardware requirement, and the security requirement can all be met, and the convenience of using the multi-party private set intersection protocol can be improved.

Figure 8:
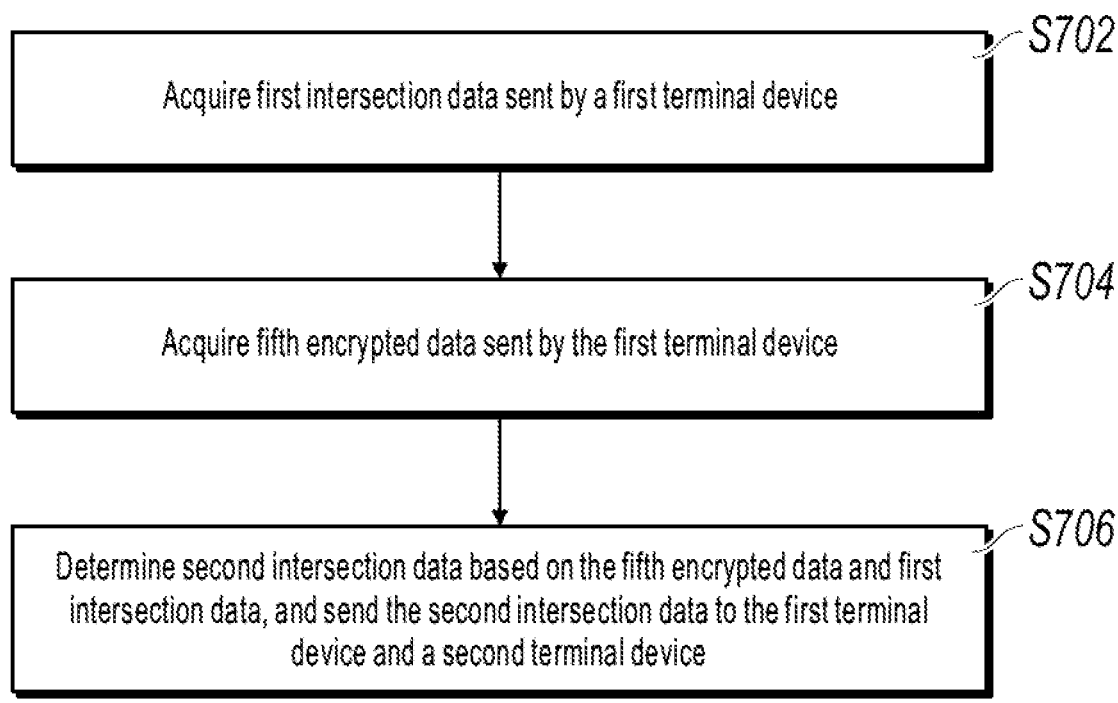
FIG. 8 is a schematic flowchart illustrating a data determination method, according to some embodiments of this specification.

FIG. 8 is a schematic flowchart illustrating a data determination method, according to some embodiments of this specification. As shown in FIG. 8, some embodiments of this specification are described from the third terminal device side. The method can include the following steps S702 to S706.

S702: Acquire first intersection data sent by a first terminal device.

In some embodiments, the first intersection data is obtained by the first terminal device based on the second encrypted data and the fourth encrypted data. The second encrypted data is obtained by the second terminal device after obtaining the first encrypted data sent by the first terminal device and encrypting the first encrypted data by using the second public key. The second encrypted data is not necessarily fixed data. For example, when the first encrypted data or the second public key changes, the second encrypted data can also change accordingly. The first terminal device can encrypt the first data set in the first terminal device by using the first public key to obtain the first encrypted data. When the first terminal device obtains the first encrypted data, the first terminal device can send the first encrypted data to the second terminal device. The second terminal device encrypts the first encrypted data by using the second public key to obtain second encrypted data, and sends the second encrypted data and third encrypted data to the first terminal device.

According to some embodiments, the fourth encrypted data is data obtained by the first terminal device by encrypting the third encrypted data sent by the second terminal device by using the first public key. The fourth encrypted data is not necessarily fixed data. For example, when the first public key or the third encrypted data changes, the fourth encrypted data can change accordingly.

Optionally, the third encrypted data is obtained by the second terminal device by encrypting the second data set in the second terminal device by using the second public key. The second data set is a data set stored in the second terminal device. The second data set is not necessarily a fixed data set. For example, when the type of data included in the second data set changes, the second data set can also change accordingly. For example, when the amount of data included in the second data set changes, the second data set can also change accordingly.

According to some embodiments, the first intersection data is obtained by the first terminal device based on the second encrypted data and the fourth encrypted data. When the first terminal device obtains the second encrypted data and the third encrypted data sent by the second terminal device, the first terminal device encrypts the third encrypted data by using the first public key to obtain the fourth encrypted data, acquires the first intersection data of the second encrypted data and the fourth encrypted data, and sends the first intersection data to the third terminal device. The third terminal device can acquire the first intersection data sent by the first terminal device.

S704: Acquire fifth encrypted data sent by the first terminal device.

In some embodiments, the fifth encrypted data can be obtained by the first terminal device based on a third data set in the third terminal device, the first public key, the second public key, and a third public key. The fifth encrypted data is not necessarily fixed data. For example, when any one of the third data set in the third terminal device, the first public key, the second public key, and the third public key changes, the third terminal device can also change accordingly.

According to some embodiments, the third data set is a data set stored in the third terminal device. The third data set is not necessarily a fixed data set. For example, when the type of data included in the third data set changes, the third data set can also change accordingly. For example, when the amount of data included in the third data set changes, the third data set can also change accordingly.

In some embodiments, the third public key is a public key generated by the third terminal device based on elliptic curve parameters. The third public key is not necessarily a fixed public key. For example, when the third private key acquired by the third terminal device changes, the third public key generated by the second terminal device based on the third private key can change accordingly.

In some embodiments, when the first terminal device obtains the fifth encrypted data based on the third data set in the third terminal device, the first public key, the second public key, and the third public key, the first terminal device can send the fifth encrypted data to the third terminal device. The third terminal device can acquire the fifth encrypted data sent by the first terminal device.

S706: Determine second intersection data based on the fifth encrypted data and the first intersection data, and send the second intersection data to the first terminal device and the second terminal device.

In some embodiments, the second intersection data is intersection data among the first data set, the second data set, and the third data set determined by the third terminal device. The second intersection data is not necessarily fixed data. For example, when any one of the first data set, the second data set, and the third data set changes, the second intersection data can also change accordingly.

According to some embodiments, when the first terminal device obtains the fifth encrypted data based on the third data set in the third terminal device, the first public key, the second public key, and the third public key, the first terminal device can send the fifth encrypted data and the first intersection data to the third terminal device. The third terminal device can acquire the fifth encrypted data and the first intersection data sent by the first terminal device. The third terminal device can determine the second intersection data based on the fifth encrypted data and the first intersection data, and send the second intersection data to the first terminal device and the second terminal device.

In some embodiments of this specification, the third terminal device can acquire the first intersection data sent by the first terminal device, acquire the fifth encrypted data sent by the first terminal device, determine the second intersection data based on the fifth encrypted data and the first intersection data, and send the second intersection data to the first terminal device and the second terminal device. Therefore, in the data determination process, the public key of each terminal device is used to encrypt the data without using a mature symmetric cryptography primitive, the network bandwidth requirement is low, and the immature homomorphic encryption is not needed. As such, low security problem can be alleviated, the security of the data determination can be improved, the network bandwidth requirement, the hardware requirement, and the security requirement can all be met, and the convenience of using the multi-party private set intersection protocol can be improved.

Figure 9:
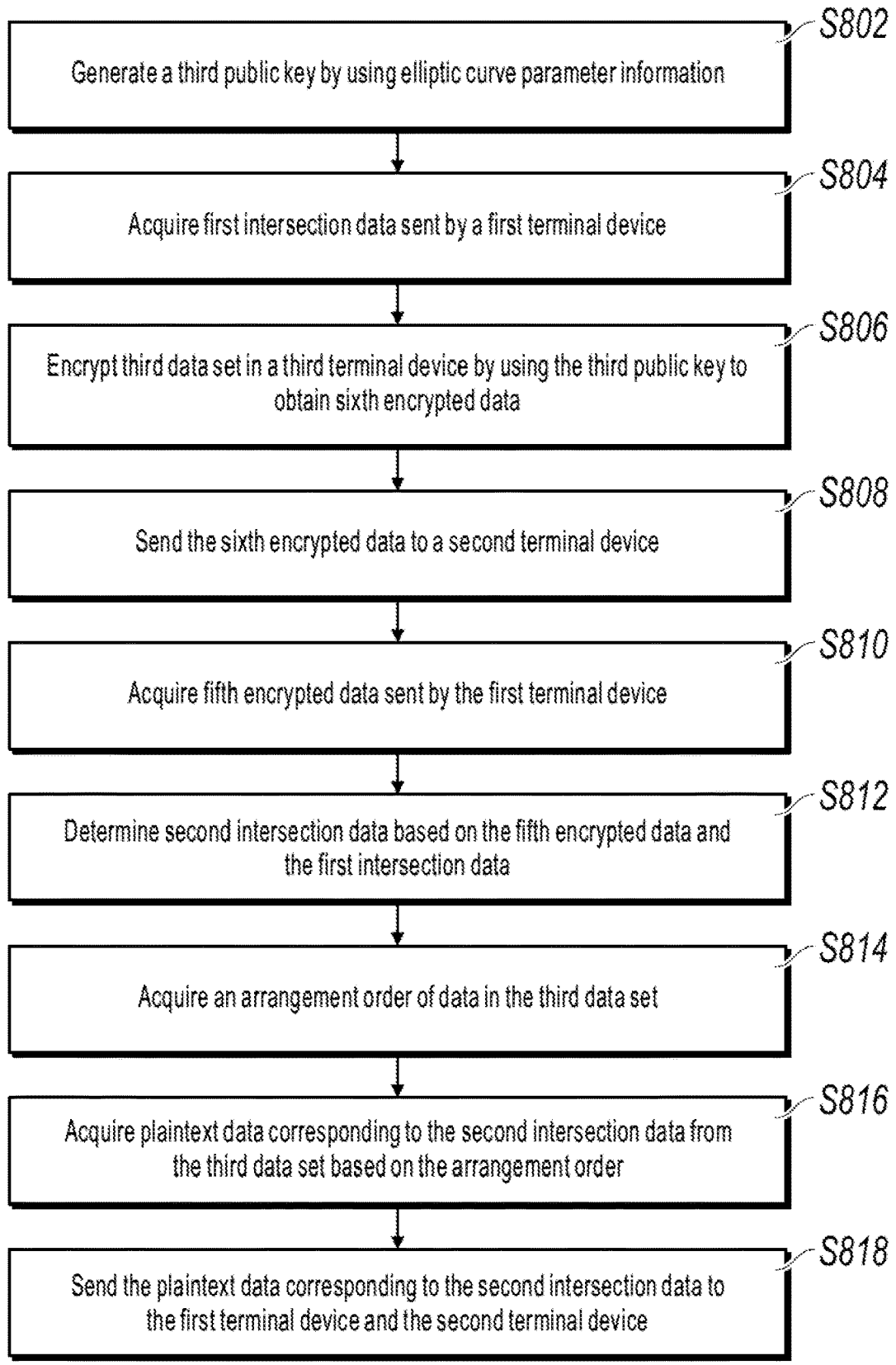
FIG. 9 is a schematic flowchart illustrating a data determination method, according to some embodiments of this specification.

FIG. 9 is a schematic flowchart illustrating a data determination method, according to some embodiments of this specification. As shown in FIG. 9, some embodiments of this specification are described from the third terminal device side. The method can include the following steps S802 to S818.

S802: Generate the third public key by using elliptic curve parameter information.

According to some embodiments, the first data set can be, for example, first advertiser information that the first terminal device can use when advertising. The first encrypted data can, for example, be obtained by the first terminal device by encrypting the first advertiser information in the first terminal device by using the first public key.

In some embodiments, the first data set can be, for example, $X_0 \in F^n$, where $X_0$ includes n elements. The first encrypted data can be, for example, $E_0$ obtained by the first terminal device by encrypting the first data set $X_0$ by using the first public key $d_0$.

S804: Acquire first intersection data sent by a first terminal device.

According to some embodiments, the first terminal device sends the first encrypted data to the second terminal device. The second terminal device encrypts the first encrypted data by using the second public key to obtain the second encrypted data, and the second terminal device can acquire the first random sequence data corresponding to the second encrypted data. The second terminal device acquires second random sequence data corresponding to the third encrypted data. The second terminal device sends the first random sequence data and the second random sequence data to the first terminal device. The first terminal device encrypts the second random sequence data by using the first public key to obtain third random sequence data, and the first terminal device acquires first intersection data of the first random sequence data and the third random sequence data, and sends the first intersection data to the third terminal device. The third terminal device can acquire the first intersection data sent by the first terminal device.

In some embodiments, the first data set can be, for example, $X_0 \in F^n$, where $X_0$ includes n elements. The first encrypted data can be, for example, $E_0$ obtained by the first terminal device by encrypting the first data set $X_0$ by using the first public key $d_0$. The second terminal device encrypts the first encrypted data $E_0$ by using the second public key $d_1$ to obtain the second encrypted data $E'_0$. The second terminal device can acquire the first random sequence data $\pi(E'_0)$ corresponding to the second encrypted data $E'_0$. The second terminal device can acquire the second random sequence data $\pi(E_1)$ corresponding to the third encrypted data $E_1$. When the second terminal device obtains the first random sequence data $\pi(E'_0)$ corresponding to the second encrypted data $E'_0$ and the second random sequence data $\pi(E_1)$ corresponding to the third encrypted data $E_1$, the second terminal device can send the first random sequence data $\pi(E'_0)$ and the second random sequence data $\pi(E_1)$ to the first terminal device. The first terminal device can encrypt the second random sequence data $\pi(E_1)$ by using the first public key $d_0$ to obtain the third random sequence data $\pi(E'_1)$. The first terminal device can acquire the first intersection data $E'_0 \cap E'_1$ of the first random sequence data $\pi(E'_0)$ and the third random sequence data $\pi(E'_1)$, and send $E'_0 \cap E'_1$ to the third terminal device. The third terminal device can acquire the first intersection data $E'_0 \cap E'_1$.

S806: Encrypt the third data set in the third terminal device by using the third public key to obtain sixth encrypted data.

In some embodiments, when the third terminal device acquires the fifth encrypted data sent by the first terminal device based on the third data set in the third terminal device, the third terminal device encrypts the third data set in the third terminal device by using the third public key to obtain sixth encrypted data. The sixth encrypted data is obtained by the third terminal device by encrypting the third data set in the third terminal device. The sixth encrypted data is not necessarily fixed encrypted data. For example, when the third public key or the third data set changes, the sixth encrypted data can also change accordingly.

According to some embodiments, the third data set can be, for example, $X_2 \in F^n$, where $X_2$ includes n elements. The sixth encrypted data $E_2$ can, for example, be obtained by the third terminal device by encrypting the third data set $X_2$ by using the third public key $d_2$.

S808: Send the sixth encrypted data to the second terminal device.

According to some embodiments, when the third terminal device acquires the fifth encrypted data sent by the first terminal device based on the third data set in the third terminal device, the third terminal device encrypts the third data set in the third terminal device by using the third public key to obtain sixth encrypted data, and the third terminal device sends the sixth encrypted data to the second terminal device.

According to some embodiments, the third data set can be, for example, $X_2 \in F^n$, where $X_2$ includes n elements. The sixth encrypted data $E_2$ can, for example, be obtained by the third terminal device by encrypting the third data set $X_2$ by using the third public key $d_2$. The third terminal device can send the sixth encrypted data $E_2$ to the second terminal device.

In some embodiments, the sixth encrypted data is used to instruct the second terminal device to encrypt the sixth encrypted data by using the second public key to obtain seventh encrypted data, and send the seventh encrypted data to the first terminal device; the seventh encrypted data is used to instruct the first terminal device to encrypt the seventh encrypted data by using the first public key to obtain the fifth encrypted data. In other words, the third terminal device can encrypt the third data set in the third terminal device by using the third public key to obtain sixth encrypted data, and the third terminal device sends the sixth encrypted data to the second terminal device. The second terminal device encrypts the sixth encrypted data by using the second public key to obtain seventh encrypted data, and the second terminal device sends the seventh encrypted data to the first terminal device. The first terminal device encrypts the seventh encrypted data by using the first public key to obtain fifth encrypted data, and the first terminal device sends the fifth encrypted data to the third terminal device.

According to some embodiments, the third data set can be, for example, $X_2 \in F^n$, where $X_2$ includes n elements. The sixth encrypted data $E_2$ can, for example, be obtained by the third terminal device by encrypting the third data set $X_2$ by using the third public key $d_2$. The third terminal device can send the sixth encrypted data $E_2$ to the second terminal device. The second terminal device can encrypt the sixth encrypted data $E_2$ by using the second public key $d_1$ to obtain the seventh encrypted data $E'_2$. The second terminal device can send the seventh encrypted data $E'_2$ to the first terminal device. The first terminal device can encrypt the seventh encrypted data $E'_2$ by using the first public key $d_0$ to obtain the fifth encrypted data $E''_2$. The first terminal device can send the fifth encrypted data $E''_2$ to the third terminal device.

S810: Acquire fifth encrypted data sent by the first terminal device.

According to some embodiments, the fifth encrypted data is obtained based on the third data set in the third terminal device, the first public key, the second public key, and the third public key. When the first terminal device sends the fifth encrypted data to the third terminal device, the third terminal device can acquire the fifth encrypted data sent by the first terminal device. For example, when the first terminal device sends the fifth encrypted data $E''_2$ to the third terminal device, the third terminal device can acquire the fifth encrypted data $E''_2$.

S812: Determine second intersection data based on the fifth encrypted data and the first intersection data.

A specific process has been described above, and details are omitted for simplicity.

In some embodiments, the third terminal device encrypts the first intersection data by using the third public key to obtain the third intersection data, and the third terminal device acquires the intersection data of the fifth encrypted data and the third intersection data to obtain the second intersection data.

In some embodiments, the third intersection data is obtained by the third terminal device by encrypting the first intersection data. The third intersection data is not necessarily fixed data. For example, when the third public key or the first intersection data changes, the third intersection data can also change accordingly. When the third terminal device obtains the first intersection data sent by the first terminal device, the third terminal device can encrypt the first intersection data by using the third public key to obtain the third intersection data.

It will be readily understood that the first terminal device can encrypt the seventh encrypted data $E'_2$ by using the first public key $d_0$ to obtain the fifth encrypted data $E''_2$. The first terminal device can send the fifth encrypted data $E''_2$ to the third terminal device. The third terminal device can encrypt the first intersection data $E'_0 \cap E'_1$ by using the third public key $d_2$ to obtain the third intersection data $E''_0 \cap E''_1$. The third terminal device can acquire the intersection data of the fifth encrypted data $E''_2$ and the third intersection data $E''_0 \cap E''_1$ to obtain the second intersection data $E''_2 \cap (E''_0 \cap E''_1)$.

S814: Acquire an arrangement order of the data in the third data set.

According to some embodiments, the third terminal device can acquire an arrangement order of the data in the third data set. The arrangement order is the arrangement order of the data in the third data set. Here, the arrangement order of the data is not necessarily a fixed order. For example, when the data included in the third data set changes, the arrangement order of the data can also change accordingly. Here, the arrangement order of the data includes, but is not limited to, a forward order or a reverse order.

S816: Acquire plaintext data corresponding to the second intersection data from the third data set based on the arrangement order.

In some embodiments, when the third terminal device obtains the arrangement order of the data in the third data set, the third terminal device can acquire the plaintext data corresponding to the second intersection data from the third data set. In other words, the data in the third data set is plaintext data, and the third terminal device can acquire the plaintext data corresponding to the second intersection data.

According to some embodiments, the plaintext data is data not encrypted in the third terminal device. The plaintext data in some embodiments of this specification is unencrypted data corresponding to the second intersection data. For example, the third terminal device acquires the plaintext data corresponding to the second intersection data $E''_2 \cap (E''_0 \cap E''_1)$ from the third data set based on the arrangement order.

S818: Send the plaintext data corresponding to the second intersection data to the first terminal device and the second terminal device.

In some embodiments, when the third terminal device acquires the plaintext data corresponding to the second intersection data from the third data set based on the arrangement order, the third terminal device can send the plaintext data corresponding to the second intersection data to the first terminal device and the second terminal device. For example, the third terminal device acquires the plaintext data corresponding to the second intersection data $E''_2 \cap (E''_0 \cap E''_1)$ from the third data set based on the arrangement order, and the third terminal device sends the plaintext data corresponding to the second intersection data $E''_2 \cap (E''_0 \cap E''_1)$ to the first terminal device and the second terminal device.

In some embodiments of this specification, the third terminal device generates the third public key by using the elliptic curve parameter information, thereby improving the security of public key generation and improving the security of data determination. Then, the third terminal device acquires the first intersection data sent by the first terminal device, encrypts the third data set in the third terminal device by using the third public key to obtain sixth encrypted data, sends the sixth encrypted data to the second terminal device, acquires the fifth encrypted data sent by the first terminal device, and determines the second intersection data based on the fifth encrypted data and the first intersection data. Since the fifth encrypted data is not random sequence data, the third terminal device can acquire plaintext data corresponding to the intersection of the first data set, the second data set, and the third data set, thereby improving the convenience of data determination. Finally, the third terminal device acquires the arrangement order of the data in the third data set, acquires the plaintext data corresponding to the second intersection data from the third data set based on the arrangement order, and sends the plaintext data corresponding to the second intersection data to the first terminal device and the second terminal device. In other words, the third terminal device can obtain the intersection data of the first data set, the second data set, and the third data set so that the accuracy of data determination can be improved and the convenience of data access in the multi-party transaction protocol can be improved.

Figure 10:
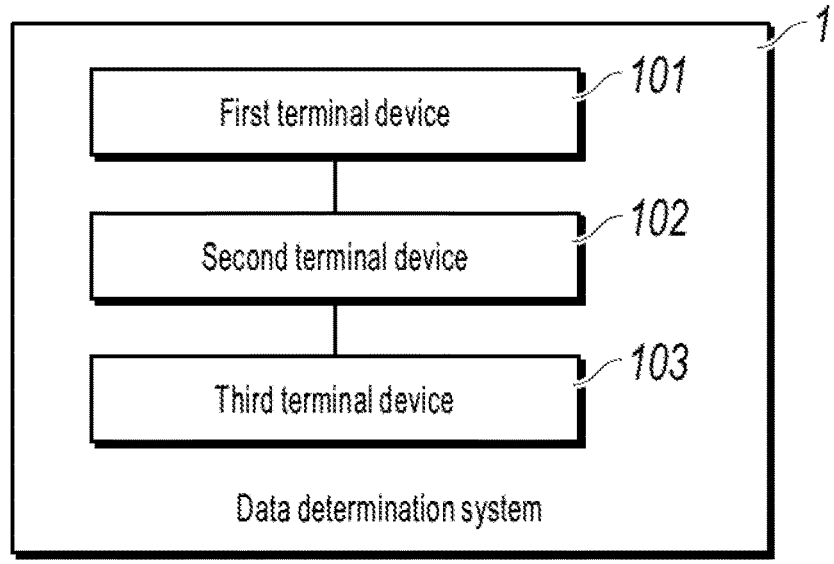
FIG. 10 is a schematic flowchart illustrating a data determination system, according to some embodiments of this specification.

FIG. 10 is a schematic structural diagram illustrating a data determination system, according to some embodiments of this specification. The data determination system 1 includes a first terminal device 101, a second terminal device 102, and a third terminal device 103. The first terminal device 101, the second terminal device 102, and the third terminal device 103 are configured to perform the data determination method described above in some embodiments shown in FIG. 2 to FIG. 9. For a specific execution process, references can be made to the detailed description of some embodiments shown in FIG. 2 to FIG. 9, and details are omitted for simplicity.

Figure 11:
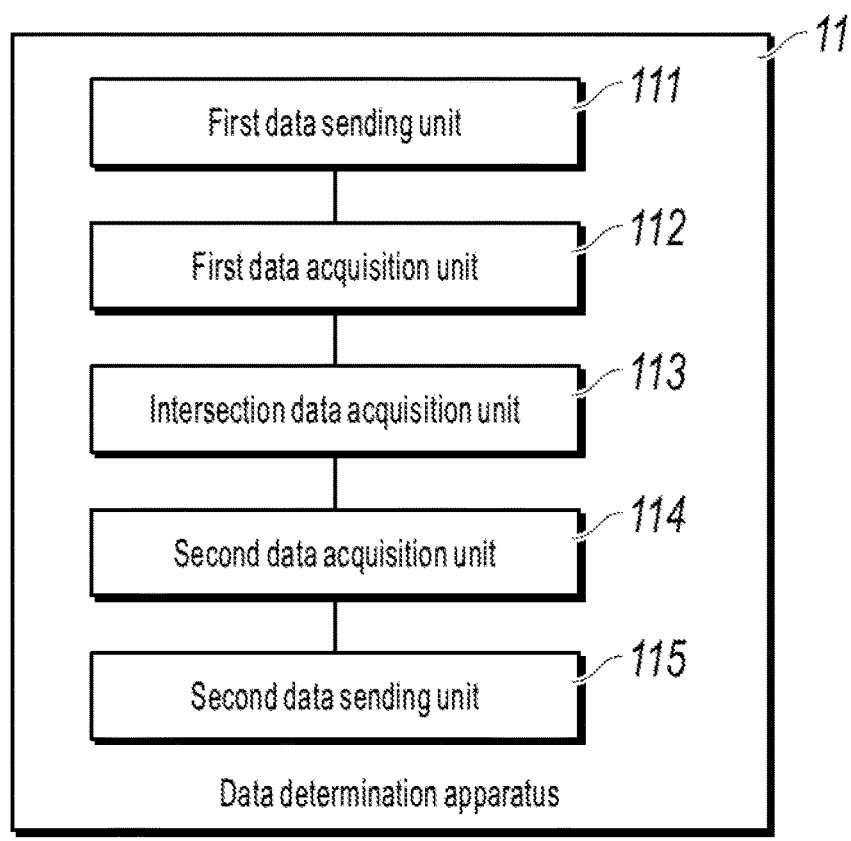
FIG. 11 is a schematic structural diagram illustrating a data determination apparatus, according to some embodiments of this specification.
Figure 12:
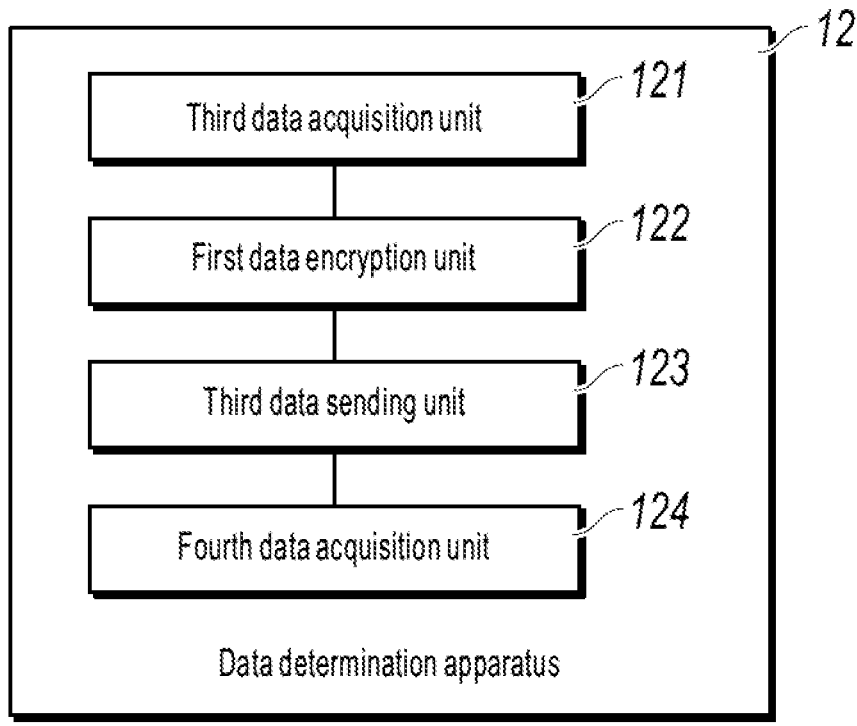
FIG. 12 is a schematic structural diagram illustrating a data determination apparatus, according to some embodiments of this specification.
Figure 13:
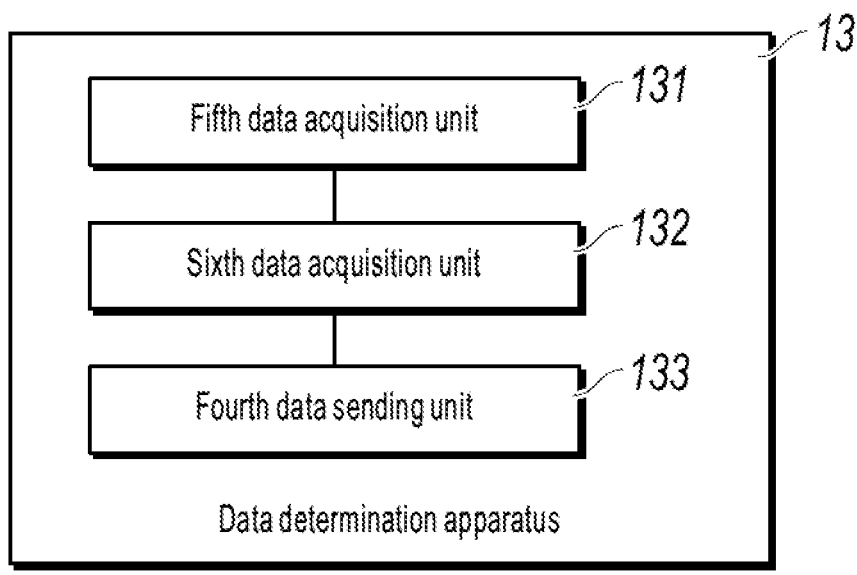
FIG. 13 is a schematic structural diagram illustrating a data determination apparatus, according to some embodiments of this specification.

With reference to FIG. 11 to FIG. 13, the following describes in detail a data determination apparatus provided in some embodiments of this specification. It is worthwhile to note that the data determination apparatus in FIG. 11 to FIG. 13 can be specifically a terminal device in some previous embodiments for performing the methods in some embodiments of this specification shown in FIG. 4 to FIG. 9. For ease of description, only parts related to some embodiments of this specification are shown. For specific technical details that are not disclosed, references are made to some embodiments of this specification shown in FIG. 4 and FIG. 9.

FIG. 11 is a schematic structural diagram illustrating a data determination apparatus, according to some example embodiments of this specification. The data determination apparatus 11 can be implemented as a whole or a part of an apparatus by using software, hardware, or a combination of software and hardware. Specifically, the data determination apparatus 11 can be a first terminal device 101 in some embodiments described above. The apparatus 11 includes a first data sending unit 111, a first data acquisition unit 112, an intersection data acquisition unit 113, a second data acquisition unit 114, and a second data sending unit 115.

The first data sending unit 111 is configured to send first encrypted data to a second terminal device, where the first encrypted data is obtained by encrypting a first data set in a first terminal device by using a first public key.

The first data acquisition unit 112 is configured to acquire second encrypted data and third encrypted data sent by the second terminal device, where the second encrypted data is obtained based on the first encrypted data and a second public key, and the third encrypted data is obtained based on the second public key and a second data set in the second terminal device.

The intersection data acquisition unit 113 is configured to encrypt the third encrypted data by using the first public key to obtain fourth encrypted data, acquire first intersection data of the second encrypted data and the fourth encrypted data, and send the first intersection data to a third terminal device.

The second data acquisition unit 114 is configured to acquire fifth encrypted data based on a third data set in the third terminal device, the first public key, the second public key, and a third public key.

The second data sending unit 115 is configured to send the fifth encrypted data to the third terminal device, and acquire second intersection data sent by the third terminal device.

According to some embodiments, the apparatus 11 further includes a public key generating unit for generating the first public key by using elliptic curve parameter information before sending the first encrypted data to the second terminal device.

According to some embodiments, when acquiring the second encrypted data and the third encrypted data sent by the second terminal device, the first data acquisition unit 112 is specifically configured to: acquire a first random sequence corresponding to the second encrypted data and a second random sequence corresponding to the third encrypted data that are sent by the second terminal device; and encrypt the third encrypted data by using the first public key to obtain fourth encrypted data, and acquire first intersection data of the second encrypted data and the fourth encrypted data, including: encrypting the second random sequence data by using the first public key to obtain third random sequence data; and acquiring first intersection data of the first random sequence data and the third random sequence data.

According to some embodiments, when acquiring fifth encrypted data based on a third data set in the third terminal device, the first public key, the second public key, and a third public key, the second data acquisition unit 114 is specifically configured to: acquire seventh encrypted data sent by the second terminal device, where the seventh encrypted data is obtained by the second terminal device by encrypting sixth encrypted data by using the second public key, and the sixth encrypted data is obtained by the third terminal device by encrypting the third data set in the third terminal device by using the third public key; and encrypt the seventh encrypted data by using the first public key to obtain the fifth encrypted data.

FIG. 12 is a schematic structural diagram illustrating a data determination apparatus, according to some example embodiments of this specification. The data determination apparatus 12 can be implemented as a whole or a part of an apparatus by using software, hardware, or a combination of software and hardware. Specifically, the data determination apparatus 12 can be a second terminal device 102 in some embodiments described above. The apparatus 12 includes a third data acquisition unit 121, a first data encryption unit 122, a third data sending unit 123, and a fourth data acquisition unit 124.

The third data acquisition unit 121 is configured to acquire first encrypted data sent by a first terminal device, where the first encrypted data is obtained by the first terminal device by encrypting a first data set in the first terminal device by using a first public key.

The first data encryption unit 122 is configured to encrypt the first encrypted data by using a second public key to obtain second encrypted data.

The third data sending unit 123 is configured to send the second encrypted data and third encrypted data to the first terminal device, where the third encrypted data is obtained by encrypting a second data set in a second terminal device by using the second public key, and the second encrypted data and the third encrypted data are used to instruct the one terminal device to acquire first intersection data based on the second encrypted data and the third encrypted data, and send the first intersection data to the third terminal device.

The fourth data acquisition unit 124 is configured to acquire second intersection data sent by the third terminal device, where the second intersection data is determined by the third terminal device based on the first intersection data and fifth encrypted data, and the fifth encrypted data is obtained based on a third data set in the third terminal device, the first public key, the second public key, and a third public key.

According to some embodiments, the apparatus 12 further includes a public key generating unit for generating the second public key by using elliptic curve parameter information before acquiring the first encrypted data sent by the first terminal device.

According to some embodiments, when sending the second encrypted data and the third encrypted data to the first terminal device, the third data sending unit 123 is specifically configured to: acquire first random sequence data corresponding to the second encrypted data; acquire second random sequence data corresponding to the third encrypted data; and send the first random sequence data and the second random sequence data to the first terminal device, where the first random sequence data and the second random sequence data are used to instruct the first terminal device to encrypt the second random sequence data by using the first public key to obtain third random sequence data, and acquire first intersection data of the first random sequence data and the third random sequence data.

According to some embodiments, before acquiring the second intersection data sent by the third terminal device, the fourth data acquisition unit 124 is further configured to acquire sixth encrypted data sent by the third terminal device, where the sixth encrypted data is obtained by the third terminal device by encrypting the third data set in the third terminal device by using the third public key; encrypt the sixth encrypted data by using the second public key to obtain seventh encrypted data; and send the seventh encrypted data to the first terminal device, where the seventh encrypted data is used to instruct the first terminal device to encrypt the seventh encrypted data by using the first public key to obtain the fifth encrypted data.

FIG. 13 is a schematic structural diagram illustrating a data determination apparatus, according to some example embodiments of this specification. The data determination apparatus 13 can be implemented as a whole or a part of an apparatus by using software, hardware, or a combination of software and hardware. Specifically, the data determination apparatus 13 can be a third terminal device 103 in some embodiments described above. The apparatus 13 includes a fifth data acquisition unit 131, a sixth data acquisition unit 132, and a fourth data sending unit 133.

The fifth data acquisition unit 131 is configured to acquire first intersection data sent by a first terminal device, where the first intersection data is obtained by the first terminal device based on second encrypted data and fourth encrypted data.

The sixth data acquisition unit 132 is configured to acquire fifth encrypted data sent by the first terminal device, where the fifth encrypted data is obtained based on a third data set in a third terminal device, a first public key, a second public key, and a third public key.

The fourth data sending unit 133 is configured to determine second intersection data based on the fifth encrypted data and the first intersection data, and send the second intersection data to the first terminal device and a second terminal device.

According to some embodiments, the apparatus 13 further includes a public key generating unit for generating the third public key by using elliptic curve parameter information before acquiring the first intersection data sent by the first terminal device.

According to some embodiments, when acquiring the fifth encrypted data sent by the first terminal device, the sixth data acquisition unit 132 is specifically configured to: encrypt the third data set in the third terminal device by using the third public key to obtain sixth encrypted data; send the sixth encrypted data to the second terminal device, where the sixth encrypted data is used to instruct the second terminal device to encrypt the sixth encrypted data by using the second public key to obtain seventh encrypted data, and send the seventh encrypted data to the first terminal device, where the seventh encrypted data is used to instruct the first terminal device to encrypt the seventh encrypted data by using the first public key to obtain the fifth encrypted data; and acquire the fifth encrypted data sent by the first terminal device.

According to some embodiments, when sending the second intersection data to the first terminal device and the second terminal device, the fourth data sending unit 133 is specifically configured to: acquire an arrangement order of the data in the third data set; acquire plaintext data corresponding to the second intersection data from the third data set based on the arrangement order; and send the plaintext data corresponding to the second intersection data to the first terminal device and the second terminal device.

In some embodiments of this specification, the first data sending unit can send the first encrypted data to the second terminal device, where the first encrypted data is obtained by encrypting the first data set in the first terminal device by using the first public key; the first data acquisition unit can acquire the second encrypted data and the third encrypted data sent by the second terminal device, where the second encrypted data is obtained based on the first encrypted data and the second public key, and the third encrypted data is obtained based on the second public key and the second data set in the second terminal device; the intersection data acquisition unit can encrypt the third encrypted data by using the first public key to obtain the fourth encrypted data, acquire the first intersection data of the second encrypted data and the fourth encrypted data, and send the first intersection data to the third terminal device; the second data acquisition unit can acquire the fifth encrypted data based on the third data set in the third terminal device, the first public key, the second public key, and the third public key; the second data sending unit can send the fifth encrypted data to the third terminal device, and acquire the second intersection data sent by the third terminal device. Therefore, in the data determination process, the public key of each terminal device is used to encrypt the data without using a mature symmetric cryptography primitive, the network bandwidth requirement is low, and the immature homomorphic encryption is not needed. As such, low security problem can be alleviated, the security of the data determination can be improved, the network bandwidth requirement, the hardware requirement, and the security requirement can all be met, and the convenience of using the multi-party private set intersection protocol can be improved.

Figure 14:
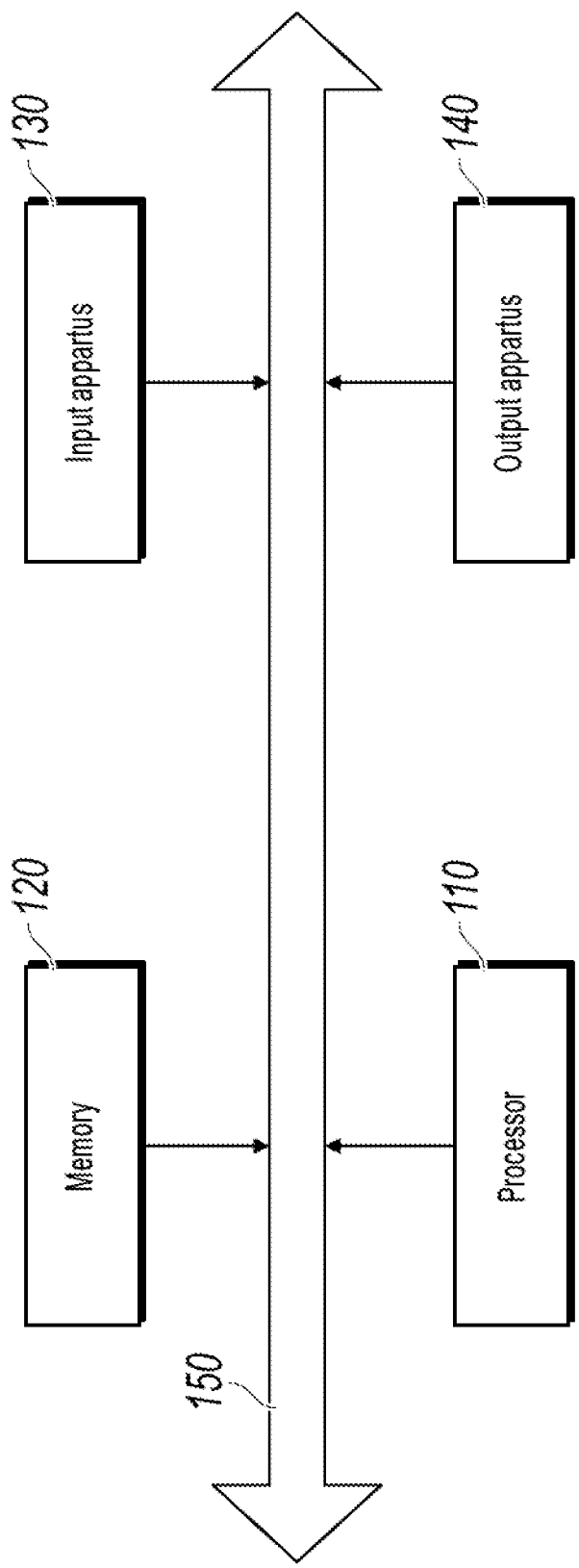
FIG. 14 is a schematic structural diagram illustrating a terminal device, according to some embodiments of this specification.

FIG. 14 is a structural block diagram illustrating a terminal device, according to some embodiments of this specification. The terminal device in some embodiments of this specification can include one or more of the following components: a processor 110, a memory 120, an input apparatus 130, an output apparatus 140, and a bus 150. The processor 110, the memory 120, the input apparatus 130, and the output apparatus 140 can be connected to each other by using the bus 150.

The processor 110 can include one or more processing cores. The processor 110 connects all parts of the entire terminal device by using various interfaces and lines, and performs various functions and data processing of the terminal device 100 by running or executing instructions, programs, code sets, or instruction sets stored in the memory 120, and invoking data stored in the memory 120. Optionally, the processor 110 can be implemented in at least one of the following hardware forms: digital signal processing (DSP), field-programmable gate array (FPGA), and programmable logic array (PLA). The processor 110 can integrate one of, or a combination of more of the following: a CPU, a graphics processing unit (GPU), a modem, and the like. The CPU mainly processes an operating system, a user page, an application, and the like. The GPU is responsible for rendering and drawing content to be displayed. The modem is used to deal with wireless communication. It will be understood that the above-described modem can alternatively be implemented by a single communication chip without being integrated into the processor 110.

The memory 120 can include a random access memory (RAM), or can include a read-only memory (ROM). Optionally, the memory 120 includes a non-transitory computer-readable storage medium. The memory 120 can be configured to store instructions, programs, code, code sets, or instruction sets. The memory 120 can include a program storage area and a data storage area. The program storage area can store instructions for implementing an operating system, instructions for implementing at least one function (such as a touch function, an audio playing function, or an image playing function), instructions for implementing some method embodiments described above, and the like. The operating system can be an Android system, including a system developed based on the Android system, an iOS system developed by Apple, including a system developed based on the iOS system, or other systems.

The memory 120 can be divided into operating system space and user space. The operating system runs in the operating system space, and native and third-party applications run in the user space. To ensure that different third-party applications can achieve good running effects, the operating system allocates corresponding system resources to different third-party applications. However, the requirements for system resources in different application scenarios of the same third-party application are different. For example, in a local resource loading scenario, third-party applications require a high disk read speed. In an animated rendering scenario, third-party applications require high GPU performance. However, the operating system and the third-party application are independent of each other, and the operating system often cannot perceive the current application scenario of the third-party application in a timely manner. Consequently, the operating system cannot perform targeted system resource adaptation according to the specific application scenario of the third-party application.

To enable the operating system to distinguish a specific application scenario of the third-party application, data communication between the third-party application and the operating system needs to be implemented so that the operating system can obtain the current scenario information of the third-party application at any time, and further perform targeted system resource adaptation based on the current scenario.

The input apparatus 130 is configured to receive the input instructions or data. The input apparatus 130 includes, but is not limited to, a keyboard, a mouse, a camera, a microphone, or a touch device. The output apparatus 140 is configured to output instructions or data. The output apparatus 140 includes, but is not limited to, a display device, a speaker, and the like. In some examples, the input apparatus 130 and the output apparatus 140 can be combined, and the input apparatus 130 and the output apparatus 140 are touchscreens.

The touchscreen can be designed as a full screen, a curved screen, or an irregular shaped screen. The touchscreen can alternatively be designed as a combination of a full screen and a curved screen, or a combination of an irregular shaped screen and a curved screen, which is not limited in some embodiments of this specification.

In addition, it will be understood by a person skilled in the art that the structure of the terminal device illustrated in the above drawings does not constitute a limitation on the terminal device. The terminal device can include more or fewer components than those shown in the figures, or can combine some components, or can have different component arrangements. For example, the terminal device further includes a radio frequency circuit, an input unit, a sensor, an audio circuit, a wireless fidelity (Wi-Fi) module, a power supply, a Bluetooth module, and the like. Details are omitted for simplicity.

In the terminal device shown in FIG. 13, the processor 110 can be configured to invoke a data determination application stored in the memory 120, and specifically perform the data determination method in some embodiments shown in FIG. 2 to FIG. 9 described above. For a specific execution process, references can be made to the detailed description of some embodiments shown in FIG. 2 to FIG. 9, and details are omitted for simplicity.

Some embodiments of this specification further provide a computer storage medium. The computer storage medium can store a plurality of instructions, and the instructions can be loaded and executed by the processor to perform the data determination method in some embodiments shown in FIG. 2 to FIG. 9. For a specific execution process, references can be made to the detailed description of some embodiments shown in FIG. 2 to FIG. 9, and details are omitted for simplicity.

This specification further provides a computer program product. The computer program product stores at least one instruction, and the at least one instruction can be loaded and executed by the processor to perform the data determination method in some embodiments shown in FIG. 2 to FIG. 9. For a specific execution process, references can be made to the detailed description of some embodiments shown in FIG. 2 to FIG. 9, and details are omitted for simplicity.

A person of ordinary skill in the art can understand that all or some of the processes of the methods in some embodiments can be implemented by a computer program instructing related hardware. The program can be stored in a computer-readable storage medium. When the program runs, the processes in some method embodiments are performed. The above storage medium can be a magnetic disk, an optical disc, a read-only memory, a random access memory, or the like.

What is disclosed above is merely some example embodiments of this specification, and certainly is not intended to limit the protection scope of this specification. Therefore, equivalent variations made in accordance with the claims of this specification shall fall within the scope of this specification.

Some specific embodiments of this specification are described previously. Other embodiments fall within the scope of the appended claims. In some cases, actions or steps described in the claims can be performed in a sequence different from that in some embodiments and desired results can still be achieved. In addition, the process depicted in the accompanying drawings does not necessarily require a particular execution order to achieve the desired results. In some implementations, multi-tasking and concurrent processing are feasible or may be advantageous.

What is claimed is:

1. A computer-implemented method, comprising:
   sending, by a first terminal device, first encrypted data to a second terminal device, wherein the first encrypted data is obtained by the first terminal device by encrypting a first data set in the first terminal device by using a first public key;
   encrypting, by the second terminal device, the first encrypted data by using a second public key to obtain second encrypted data;
   sending, by the second terminal device, the second encrypted data and third encrypted data to the first terminal device, wherein the third encrypted data is obtained by the second terminal device by encrypting a second data set in the second terminal device by using the second public key;
   encrypting, by the first terminal device, the third encrypted data by using the first public key to obtain fourth encrypted data;
   acquiring, by the first terminal device, first intersection data of the second encrypted data and the fourth encrypted data; and
   sending, by the first terminal device, the first intersection data to a third terminal device.

2. The computer-implemented method according to claim 1, further comprising:
   acquiring, by the third terminal device, fifth encrypted data from the first terminal device, wherein the fifth encrypted data is obtained based on a third data set in the third terminal device, the first public key, the second public key, and a third public key; and
   determining, by the third terminal device, second intersection data based on the fifth encrypted data and the first intersection data, and sending the second intersection data to the first terminal device and the second terminal device.

3. The computer-implemented method according to claim 2, before the sending, by a first terminal device, first encrypted data to a second terminal device, further comprising:

generating, by the first terminal device, the first public key by using elliptic curve parameter information;
   generating, by the second terminal device, the second public key by using the elliptic curve parameter information; and
   generating, by the third terminal device, the third public key by using the elliptic curve parameter information.

4. The computer-implemented method according to claim 1, wherein the sending, by the second terminal device, the second encrypted data and third encrypted data to the first terminal device comprises:
   acquiring, by the second terminal device, first random sequence data corresponding to the second encrypted data;
   acquiring, by the second terminal device, second random sequence data corresponding to the third encrypted data; and
   sending, by the second terminal device, the first random sequence data and the second random sequence data to the first terminal device.

5. The computer-implemented method according to claim 4, wherein the encrypting, by the first terminal device, the third encrypted data by using the first public key to obtain fourth encrypted data, and the acquiring, by the first terminal device, first intersection data of the second encrypted data and the fourth encrypted data comprises:
   encrypting, by the first terminal device, the second random sequence data by using the first public key to obtain third random sequence data; and
   acquiring, by the first terminal device, first intersection data of the first random sequence data and the third random sequence data.

6. The computer-implemented method according to claim 2, wherein the determining, by the third terminal device, second intersection data based on the fifth encrypted data and the first intersection data comprises:
   encrypting, by the third terminal device, the first intersection data by using the third public key to obtain third intersection data; and
   acquiring, by the third terminal device, intersection data of the fifth encrypted data and the third intersection data to obtain the second intersection data.

7. The computer-implemented method according to claim 2, wherein the acquiring, by the third terminal device, fifth encrypted data from the first terminal device based on a third data set in the third terminal device comprises:
   encrypting, by the third terminal device, the third data set in the third terminal device by using the third public key to obtain sixth encrypted data;
   sending, by the third terminal device, the sixth encrypted data to the second terminal device;
   encrypting, by the second terminal device, the sixth encrypted data by using the second public key to obtain seventh encrypted data;
   sending, by the second terminal device, the seventh encrypted data to the first terminal device;
   encrypting, by the first terminal device, the seventh encrypted data by using the first public key to obtain fifth encrypted data; and
   sending, by the first terminal device, the fifth encrypted data to the third terminal device.

8. The computer-implemented method according to claim 2, wherein the sending the second intersection data to the first terminal device and the second terminal device comprises:
   acquiring, by the third terminal device, an arrangement order of data in the third data set;

acquiring, by the third terminal device, plaintext data corresponding to the second intersection data from the third data set based on the arrangement order; and sending, by the third terminal device, the plaintext data corresponding to the second intersection data to the first terminal device and the second terminal device.

9. A computer-implemented system, comprising:

one or more computers comprising a first computer, a second computer, and a third computer; and one or more computer memory devices interoperably coupled with the one or more computers and having tangible, non-transitory, machine-readable media storing one or more instructions that, when executed by the one or more computers, perform one or more operations comprising:

sending, by the first computer, first encrypted data to the second computer, wherein the first encrypted data is obtained by the first computer by encrypting a first data set in the first computer by using a first public key;

encrypting, by the second computer, the first encrypted data by using a second public key to obtain second encrypted data;

sending, by the second computer, the second encrypted data and third encrypted data to the first computer, wherein the third encrypted data is obtained by the second computer by encrypting a second data set in the second computer by using the second public key;

encrypting, by the first computer, the third encrypted data by using the first public key to obtain fourth encrypted data;

acquiring, by the first computer, first intersection data of the second encrypted data and the fourth encrypted data; and sending, by the first computer, the first intersection data to the third computer.

10. The computer-implemented system according to claim 9, wherein the one or more operations further comprise:

acquiring, by the third computer, fifth encrypted data from the first computer, wherein the fifth encrypted data is obtained based on a third data set in the third computer, the first public key, the second public key, and a third public key; and determining, by the third computer, second intersection data based on the fifth encrypted data and the first intersection data, and sending the second intersection data to the first computer and the second computer.

11. The computer-implemented system according to claim 10, wherein before the sending, by the first computer, first encrypted data to the second computer, the one or more operations further comprise:

generating, by the first computer, the first public key by using elliptic curve parameter information;

generating, by the second computer, the second public key by using the elliptic curve parameter information; and generating, by the third computer, the third public key by using the elliptic curve parameter information.

12. The computer-implemented system according to claim 9, wherein the sending, by the second computer, the second encrypted data and third encrypted data to the first computer comprises:

acquiring, by the second computer, first random sequence data corresponding to the second encrypted data;

acquiring, by the second computer, second random sequence data corresponding to the third encrypted data; and sending, by the second computer, the first random sequence data and the second random sequence data to the first computer.

13. The computer-implemented system according to claim 12, wherein the encrypting, by the first computer, the third encrypted data by using the first public key to obtain fourth encrypted data, and the acquiring, by the first computer, first intersection data of the second encrypted data and the fourth encrypted data comprises:

encrypting, by the first computer, the second random sequence data by using the first public key to obtain third random sequence data; and acquiring, by the first computer, first intersection data of the first random sequence data and the third random sequence data.

14. The computer-implemented system according to claim 10, wherein the determining, by the third computer, second intersection data based on the fifth encrypted data and the first intersection data comprises:

encrypting, by the third computer, the first intersection data by using the third public key to obtain third intersection data; and acquiring, by the third computer, intersection data of the fifth encrypted data and the third intersection data to obtain the second intersection data.

15. The computer-implemented system according to claim 10, wherein the acquiring, by the third computer, fifth encrypted data from the first computer based on a third data set in the third computer comprises:

encrypting, by the third computer, the third data set in the third computer by using the third public key to obtain sixth encrypted data;

sending, by the third computer, the sixth encrypted data to the second computer;

encrypting, by the second computer, the sixth encrypted data by using the second public key to obtain seventh encrypted data;

sending, by the second computer, the seventh encrypted data to the first computer;

encrypting, by the first computer, the seventh encrypted data by using the first public key to obtain fifth encrypted data; and sending, by the first computer, the fifth encrypted data to the third computer.

16. The computer-implemented system according to claim 10, wherein the sending the second intersection data to the first computer and the second computer comprises:

acquiring, by the third computer, an arrangement order of data in the third data set;

acquiring, by the third computer, plaintext data corresponding to the second intersection data from the third data set based on the arrangement order; and sending, by the third computer, the plaintext data corresponding to the second intersection data to the first computer and the second computer.

17. A non-transitory, computer-readable medium storing one or more instructions executable by a computer system to perform one or more operations comprising:

sending, by a first computer of the computer system, first encrypted data to a second computer of the computer system, wherein the first encrypted data is obtained by the first computer by encrypting a first data set in the first computer by using a first public key;

encrypting, by the second computer, the first encrypted data by using a second public key to obtain second encrypted data;

sending, by the second computer, the second encrypted data and third encrypted data to the first computer, wherein the third encrypted data is obtained by the second computer by encrypting a second data set in the second computer by using the second public key;

encrypting, by the first computer, the third encrypted data by using the first public key to obtain fourth encrypted data;

acquiring, by the first computer, first intersection data of the second encrypted data and the fourth encrypted data; and sending, by the first computer, the first intersection data to a third computer of the computer system.

18. The non-transitory, computer-readable medium according to claim 17, wherein the one or more operations further comprise:

acquiring, by the third computer, fifth encrypted data from the first computer, wherein the fifth encrypted data is obtained based on a third data set in the third computer, the first public key, the second public key, and a third public key; and determining, by the third computer, second intersection data based on the fifth encrypted data and the first intersection data, and sending the second intersection data to the first computer and the second computer.

19. The non-transitory, computer-readable medium according to claim 18, wherein before the sending, by a first computer of the computer system, first encrypted data to the second computer of the computer system, the one or more operations further comprise:

generating, by the first computer, the first public key by using elliptic curve parameter information;

generating, by the second computer, the second public key by using the elliptic curve parameter information; and generating, by the third computer, the third public key by using the elliptic curve parameter information.

20. The non-transitory, computer-readable medium according to claim 17, wherein the sending, by the second computer, the second encrypted data and third encrypted data to the first computer comprises:

acquiring, by the second computer, first random sequence data corresponding to the second encrypted data;

acquiring, by the second computer, second random sequence data corresponding to the third encrypted data; and sending, by the second computer, the first random sequence data and the second random sequence data to the first computer.

* * * * *